United States Patent
Hara et al.

(10) Patent No.: US 11,559,857 B2
(45) Date of Patent: Jan. 24, 2023

(54) LASER CUTTING AND MACHINING METHOD FOR PLATED STEEL PLATE, LASER CUT-AND-MACHINED PRODUCT, THERMAL CUTTING AND MACHINING METHOD, THERMAL CUT-AND-MACHINED PRODUCT, SURFACE-TREATED STEEL PLATE, LASER CUTTING METHOD, AND LASER MACHINING HEAD

(71) Applicants: AMADA CO., LTD., Kanagawa (JP); NISSHIN STEEL CO., LTD., Tokyo (JP)

(72) Inventors: Hideo Hara, Kanagawa (JP); Masahito Ito, Kanagawa (JP); Masanori Uehara, Kanagawa (JP); Hiroshi Asada, Tokyo (JP); Hirokazu Sasaki, Tokyo (JP); Hiroshi Horikawa, Tokyo (JP)

(73) Assignee: AMADA CO., LTD., Kanagawa (JP)

( * ) Notice: Subject to any disclaimer, the term of this patent is extended or adjusted under 35 U.S.C. 154(b) by 88 days.

(21) Appl. No.: 16/933,600

(22) Filed: Jul. 20, 2020

(65) Prior Publication Data
US 2020/0346306 A1 Nov. 5, 2020

Related U.S. Application Data

(62) Division of application No. 16/301,670, filed as application No. PCT/JP2017/018528 on May 17, 2017, now Pat. No. 10,759,005.

(30) Foreign Application Priority Data

| May 18, 2016 | (JP) | JP2016-099292 |
| May 18, 2016 | (JP) | JP2016-099867 |
| May 12, 2017 | (JP) | JP2017-095393 |

(51) Int. Cl.
  B23K 26/38 (2014.01)
  B23K 26/046 (2014.01)
  (Continued)

(52) U.S. Cl.
  CPC ............ *B23K 26/38* (2013.01); *B23K 26/046* (2013.01); *B23K 26/0853* (2013.01);
  (Continued)

(58) Field of Classification Search
  CPC .. B23K 26/38; B23K 26/046; B23K 26/1436; B23K 26/40; B23K 26/1464; B23K 2103/04
  (Continued)

(56) References Cited

U.S. PATENT DOCUMENTS

| 5,847,357 A | 12/1998 | Woodmansee et al. |
| 6,040,549 A | 3/2000 | Kanaoka |

(Continued)

FOREIGN PATENT DOCUMENTS

| EP | 0985484 | 3/2000 |
| JP | 63-264288 | 11/1988 |

(Continued)

OTHER PUBLICATIONS

Indian Official Action issued in Application No. 201847047269, dated Feb. 19, 2021.
(Continued)

*Primary Examiner* — Thien S Tran
(74) *Attorney, Agent, or Firm* — Greenblum & Bernstein, P.L.C.

(57) ABSTRACT

A laser cut-and-machined product made from a plated steel plate. A cut face of the plated steel plate is coated with
(Continued)

plating-layer-containing metal of a top surface of the plated steel plate that is melted and/or evaporated at the time of laser cutting and machining.

5 Claims, 31 Drawing Sheets

(51) Int. Cl.
| | |
|---|---|
| B23K 26/40 | (2014.01) |
| B23K 26/08 | (2014.01) |
| B23K 26/14 | (2014.01) |
| B23K 103/04 | (2006.01) |
| B23K 101/34 | (2006.01) |
| B23K 103/16 | (2006.01) |

(52) U.S. Cl.
CPC .......... *B23K 26/14* (2013.01); *B23K 26/1436* (2015.10); *B23K 26/1464* (2013.01); *B23K 26/1482* (2013.01); *B23K 26/40* (2013.01); *B23K 2101/34* (2018.08); *B23K 2103/04* (2018.08); *B23K 2103/172* (2018.08)

(58) Field of Classification Search
USPC .............. 219/121.6, 121.64, 121.67, 121.71, 219/121.72, 121.78
See application file for complete search history.

(56) References Cited

U.S. PATENT DOCUMENTS

| | | | |
|---|---|---|---|
| 2008/0264912 | A1 | 10/2008 | Danzer |
| 2009/0236323 | A1 | 9/2009 | Sun et al. |
| 2011/0226746 | A1 | 9/2011 | Briand et al. |
| 2012/0160818 | A1 | 6/2012 | Miyazaki |
| 2013/0146573 | A1 | 6/2013 | Hamaguchi |
| 2014/0151347 | A1* | 6/2014 | Evangelista ......... B23K 26/364 219/121.69 |
| 2017/0291262 | A1 | 10/2017 | Ishiguro |

FOREIGN PATENT DOCUMENTS

| | | |
|---|---|---|
| JP | 63264288 A * | 11/1988 |
| JP | 7-236984 | 9/1995 |
| JP | 2001-219284 | 8/2001 |
| JP | 2001-353588 | 12/2001 |
| JP | 2002-361461 | 12/2002 |
| JP | 2011-518670 | 6/2011 |
| JP | 2014-133259 | 7/2014 |
| JP | 2014-237141 | 12/2014 |
| KR | 10-2015-6086485 | 7/2015 |
| KR | 2016-0036472 | 4/2016 |
| RU | 2194615 | 12/2002 |
| RU | 2384648 | 3/2010 |
| RU | 2430190 | 9/2011 |
| RU | 2465369 | 10/2012 |
| WO | 2015/162445 | 10/2015 |
| WO | 2016/059938 | 4/2016 |

OTHER PUBLICATIONS

Official Action New Zealand IP No. 748762, dated Oct. 9, 2019.
Non Patent document A653/A653M, entitled "Standard Specification for Steel Sheet, Zinc-Coated (Galvanized) or Zinc-Iron Alloy-Coated (Galvannealed) by the Hot-Dip Process," having a purported publication date of Nov. 25, 2009.
Official Action in Chinese Patent Application No. 2017800309695, dated Sep. 4, 2019.
Official Action received in Counterpart Russian Application, dated Dec. 12, 2019.
China Official Action received in 201780030969.5, dated Mar. 2, 2020.
Korean Official Action received in 10-2018-7032721, dated Jan. 14, 2020.
Kenji Sekine et al., "The corrosion resistance of edge sutfaces on zinc plated steel plates", Rust Prevention & Control Japan, vol. 30, No. 4, Japan Association of Corrosion Control, ISSN 0520-6340, Apr. 1, 1986, pp. 101-107.
International Search Report issued in Patent Application No. PCT/JP2017/018528, dated Jul. 4, 2017.
Notification of Reasons for Refusal received in JP Patent Application No. 2017-095393, dated Jun. 27, 2017.
Decision to Grant a Patent received in JP Patent Application No. 2017-095393, dated Aug. 18, 2017.
Official Communication issued in European Patent Office (EPO) Patent Application No. 17799429.0, dated May 13, 2019.
Office Action issued in Republic of Korea Counterpart Patent Appl. No. 10-2018-7032721, dated Sep. 27, 2019, along with an English translation thereof.

* cited by examiner

- ASSIST GAS: EZ NOZZLE: φ4.0 CUTTING SPEED: 1120~3840 ASSIST GAS PRESSURE: 0.9MPa
  NOZZLE GAP: 0.3mm FOCUS: -4.5mm

| PARAMETER | SLOW ⟵ ⟶ FAST | | | | |
|---|---|---|---|---|---|
| CUTTING SPEED | F=1120 | F=1280 | F=1600 | F=3040 | F=3840 |
| PHOTO | | | | | |

- Speeding up cutting speed increases coating quantity of plating-layer-containing metal on cut end face.

FIG. 8
| STATE | MARK | PLASMA STATE |
|---|---|---|
| NO PLASMA GENERATION | NIL | 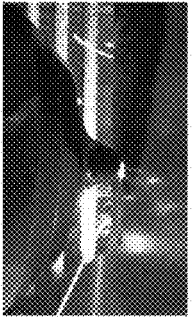 |
| WEAK PLASMA GENERATION | p | 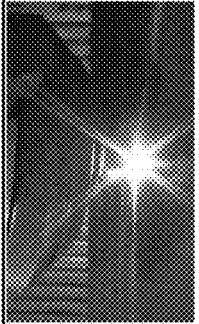 |
| PLASMA GENERATION | p |  |

FIG. 9

| STATE | MARK | PHOTO |
|---|---|---|
| NO RUSTING | ○ | |
| RUSTING | × | |

FIG. 10
ONE-MONTH EXPOSURE, PLATE THICKNESS t = 2.3mm,
FOCAL POSITION: -0.5mm
| PLATING QUANTITY | | | K14 | | | | | | | |
|---|---|---|---|---|---|---|---|---|---|---|
| NOZZLE DIAMETER (mm) | | | S2.0 | | | D4.0 | | | D7.0 | | |
| ASSIST GAS PRESSURE (MPa) | | | 0.9 | 0.7 | 0.5 | 0.9 | 0.7 | 0.5 | 0.9 | 0.7 | 0.5 |
| PLATE t = 2.3 | CUTTING SPEED mm/min | 1000 | NIL× | NIL× | NIL× | NIL× | NIL× | NIL× | p× | p× | p× |
| | | 2000 | NIL× | NIL× | NIL× | NIL× | NIL× | NIL× | p× | p× | p× |
| | | 3000 | P× | P× | PO | PO | PO | PO | pO | pO | pO |
| | | 4000 | P× | PO | PO | PO | PO | PO | PO | PO | PO |
| | | 5000 | P× | PO | PO | PO | PO | PO | PO | PO | PO |
(A) K14 S2.0
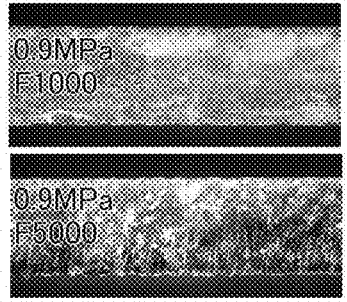
(B) K14 D4.0
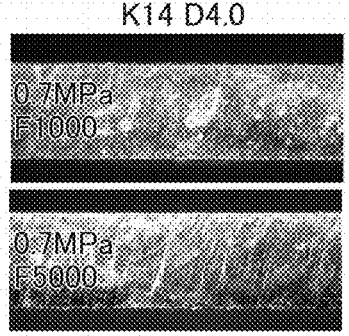
(C) K14 D7.0
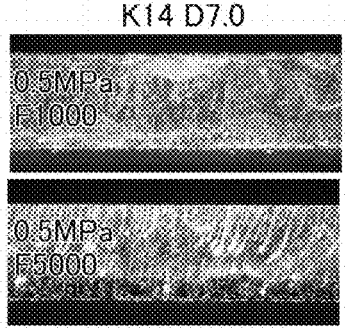

FIG. 11
ONE-MONTH EXPOSURE, PLATE THICKNESS t = 2.3mm,
FOCAL POSITION: -0.5mm
| PLATING QUANTITY | | | K27 | | | | | | | |
|---|---|---|---|---|---|---|---|---|---|---|
| NOZZLE DIAMETER (mm) | | | S2.0 | | | D4.0 | | | D7.0 | | |
| ASSIST GAS PRESSURE (MPa) | | | 0.9 | 0.7 | 0.5 | 0.9 | 0.7 | 0.5 | 0.9 | 0.7 | 0.5 |
| PLATE t = 2.3 | CUTTING SPEED mm/min | 1000 | NIL× | NIL× | NIL× | NIL× | NIL○ | NIL× | p○ | p○ | p× |
| | | 2000 | p× | p× | p× | p× | p○ | p○ | p○ | p○ | p○ |
| | | 3000 | P○ | P○ | P○ | P○ | P○ | P○ | P○ | P○ | P○ |
| | | 4000 | P○ | P○ | P○ | P○ | P○ | P○ | P○ | P○ | P○ |
| | | 5000 | P○ | P○ | P○ | P○ | P○ | P○ | P○ | P○ | P○ |
(A) K27 S2.0
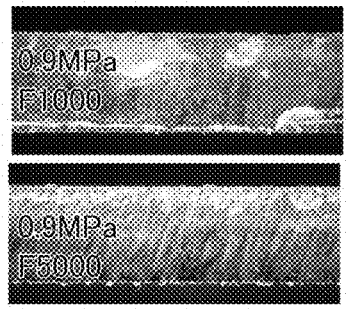
(B) K27 D4.0
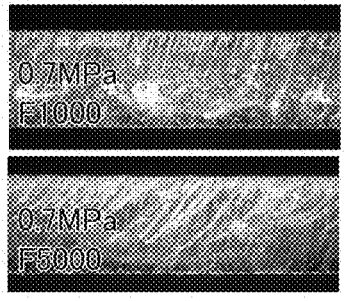
(C) K27 D7.0
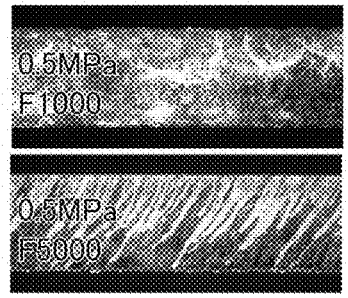

FIG. 12
ONE-MONTH EXPOSURE, PLATE THICKNESS t = 2.3mm,
FOCAL POSITION: -0.5mm
| PLATING QUANTITY | | | K35 | | | | | | | |
|---|---|---|---|---|---|---|---|---|---|---|
| NOZZLE DIAMETER (mm) | | | S2.0 | | | D4.0 | | | D7.0 | | |
| ASSIST GAS PRESSURE (MPa) | | | 0.9 | 0.7 | 0.5 | 0.9 | 0.7 | 0.5 | 0.9 | 0.7 | 0.5 |
| PLATE t = 2.3 | CUTTING SPEED (mm/min) | 1000 | NIL× | NIL× | NIL× | P× | p× | p× | p× | p× | p× |
| | | 2000 | P× | P× | P× | P× | PO | PO | PO | PO | PO |
| | | 3000 | PO | PO | PO | PO | PO | PO | PO | PO | PO |
| | | 4000 | PO | PO | PO | PO | PO | PO | PO | PO | PO |
| | | 5000 | PO | PO | PO | PO | PO | PO | PO | PO | PO |
(A) K35 S2.0
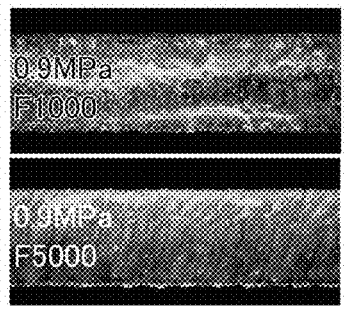
(B) K35 D4.0
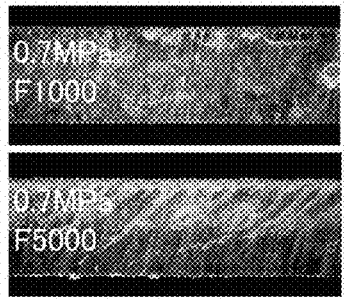
(C) K35 D7.0
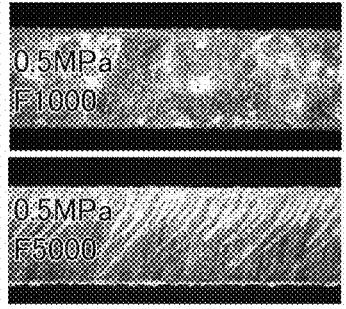

FIG. 13  ONE-MONTH EXPOSURE, PLATE THICKNESS t = 3.2mm, FOCAL POSITION: -0.5mm

| PLATING QUANTITY | | | K14 | | | | | | |
|---|---|---|---|---|---|---|---|---|---|
| NOZZLE DIAMETER (mm) | | | S2.0 | | D4.0 | | | D7.0 | |
| ASSIST GAS PRESSURE (MPa) | | | 0.9 | 0.7 | 0.9 | 0.7 | 0.5 | 0.9 | 0.7 | 0.5 |
| PLATE t = 3.2 | CUTTING SPEED mm/min | 1000 | NIL× | NIL× | NIL× | NIL× | NIL× | p× | p× | NIL× |
| | | 1500 | NIL× | NIL× | NIL× | NIL× | NIL× | p× | p× | p× |
| | | 2000 | NIL× | NIL× | NIL× | NIL× | NIL× | p× | p× | p× |
| | | 2500 | NIL× | NIL× | NIL× | NIL× | NIL× | P× | P× | p× |
| | | 3000 | NIL× | NIL× | NIL× | NIL× | p× | P× | P× | NG |
| | | 3500 | NIL× | NIL× | NIL× | NG | NG | NG | NG | NG |
| | | 4000 | NIL× | p× | NG | NG | NG | NG | NG | NG |

(A) K14 S2.0

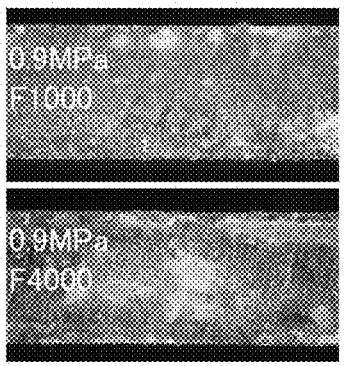

(B) K14 D4.0

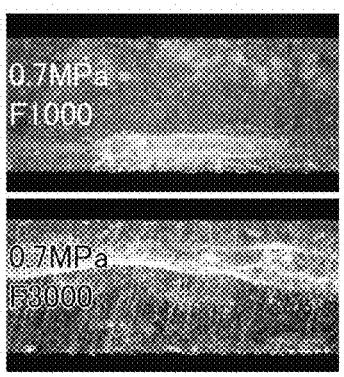

(C) K14 D7.0

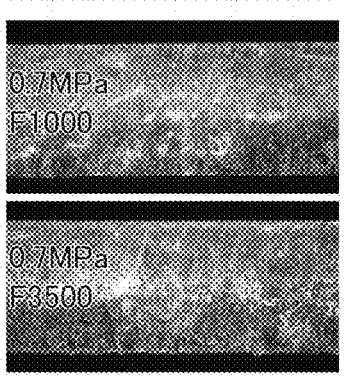

FIG. 14 ONE-MONTH EXPOSURE, PLATE THICKNESS t = 3.2mm, FOCAL POSITION: -0.5mm
| PLATING QUANTITY | | | \multicolumn{8}{c}{K27} |
|---|---|---|---|---|---|---|---|---|---|---|
| NOZZLE DIAMETER (mm) | | | S2.0 | | D4.0 | | | D7.0 | | |
| ASSIST GAS PRESSURE (MPa) | | | 0.9 | 0.7 | 0.9 | 0.7 | 0.5 | 0.9 | 0.7 | 0.5 |
| PLATE t = 3.2 | CUTTING SPEED mm/min | 1000 | NIL× | NIL× | NIL× | NIL× | NIL× | p× | pO | pO |
| | | 1500 | NIL× | NIL× | NIL× | NIL× | NIL× | p× | pO | pO |
| | | 2000 | NIL× | NIL× | p× | p× | p× | pO | pO | pO |
| | | 2500 | p× | p× | p× | pO | pO | PO | PO | PO |
| | | 3000 | P× | PO | PO | PO | PO | PO | PO | PO |
| | | 3500 | PO | PO | PO | PO | PO | PO | PO | PO |
| | | 4000 | PO | PO | NG | NG | NG | NG | NG | NG |
(A) K27 S2.0
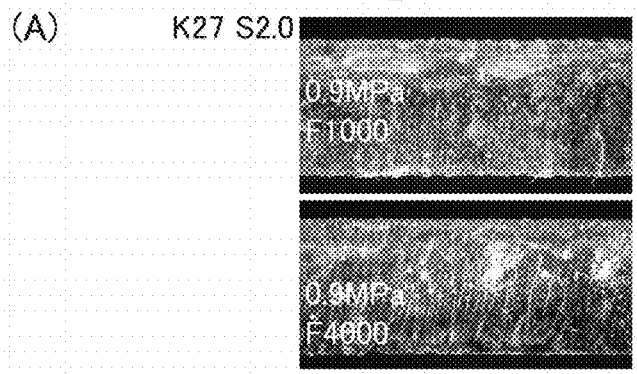
(B) K27 D4.0
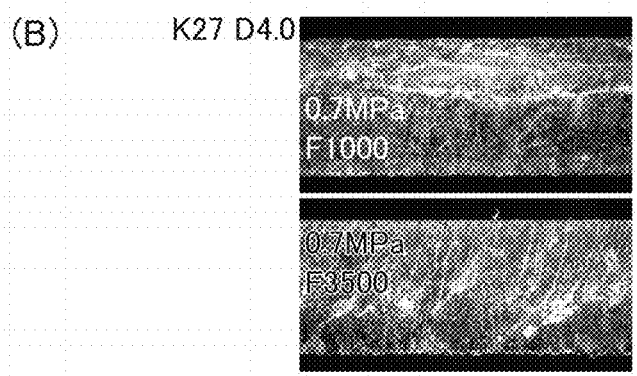
(C) K27 D7.0
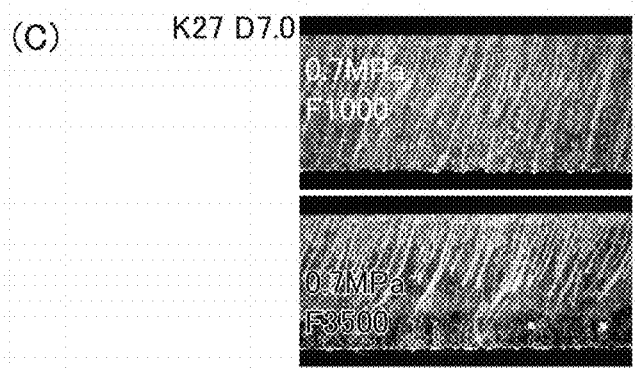

FIG. 15 ONE-MONTH EXPOSURE, PLATE THICKNESS t = 3.2mm, FOCAL POSITION: -0.5mm
| PLATING QUANTITY | | | K35 | | | | | | |
|---|---|---|---|---|---|---|---|---|---|
| NOZZLE DIAMETER (mm) | | | S2.0 | | D4.0 | | | D7.0 | |
| ASSIST GAS PRESSURE (MPa) | | | 0.9 | 0.7 | 0.9 | 0.7 | 0.5 | 0.9 | 0.7 | 0.5 |
| PLATE t = 3.2 | CUTTING SPEED mm/min | 1000 | NIL × | NIL × | NIL × | NIL × | NIL × | p × | pO | pO |
| | | 1500 | NIL × | NIL × | NIL × | NIL × | NIL × | pO | pO | p × |
| | | 2000 | p × | p × | p × | p × | p × | PO | PO | PO |
| | | 2500 | P × | p × | PO | PO | PO | PO | PO | PO |
| | | 3000 | P × | PO | PO | PO | PO | PO | PO | PO |
| | | 3500 | PO | PO | PO | PO | PO | NG | NG | NG |
| | | 4000 | NG | NG | NG | NG | NG | NG | NG | NG |
(A) K35 S2.0
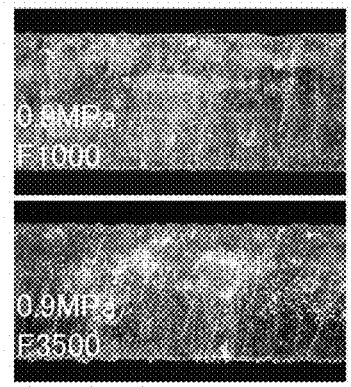
(B) K35 D4.0
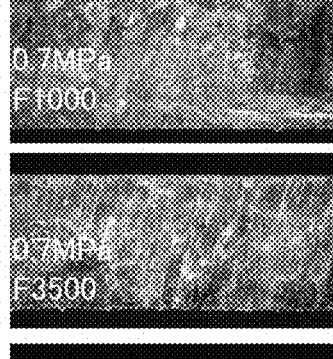
(C) K35 D7.0
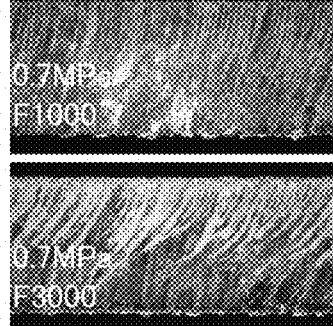

FIG. 16
ONE-MONTH EXPOSURE, PLATE THICKNESS t = 4.5mm,
FOCAL POSITION: -0.5mm
| PLATING QUANTITY | | | K27 | | | | | | K35 | | | | |
|---|---|---|---|---|---|---|---|---|---|---|---|---|---|
| NOZZLE DIAMETER (mm) | | | D4.0 | | | D7.0 | | | D4.0 | | | D7.0 | | |
| ASSIST GAS PRESSURE (MPa) | | | 0.9 | 0.7 | 0.5 | 0.9 | 0.7 | 0.5 | 0.9 | 0.7 | 0.5 | 0.9 | 0.7 | 0.5 |
| PLATE t = 4.5 | CUTTING SPEED mm/min | 1000 | NIL× | NIL× | × | P× | P× | D× | NIL× | NIL× | D× | PO | PO | D× |
| | | 1500 | NIL× | NIL× | × | PO | PO | NG | p× | NIL× | × | PO | PO | NG |
| | | 2000 | p× | p× | × | PO | PO | DO | p× | NIL× | × | PO | PO | DO |
| | | 2200 | p× | p× | NG | NG | PO | NG | P× | p× | × | PO | PO | NG |
| | | 2500 | NG | NG | NG | NG | NG | NG | NG | NG | NG | NG | NG | NG |
(A) K27 D4.0
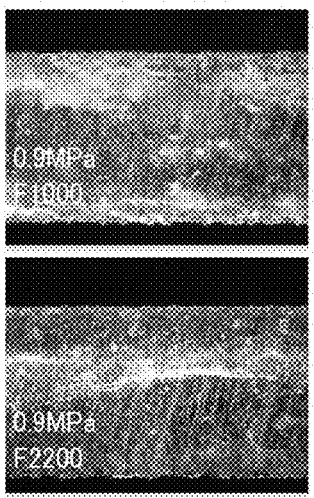
(C) K35 D4.0
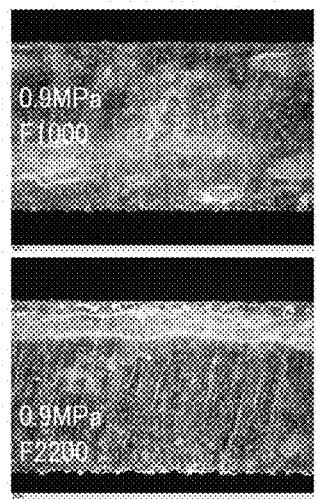
(B) K27 D7.0
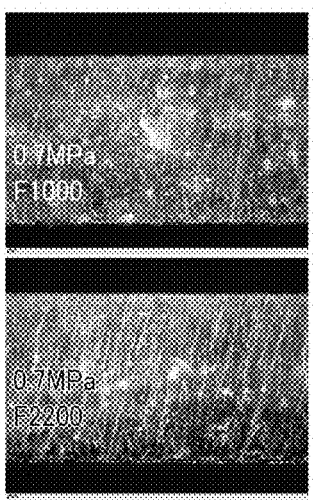
(D) K35 D7.0
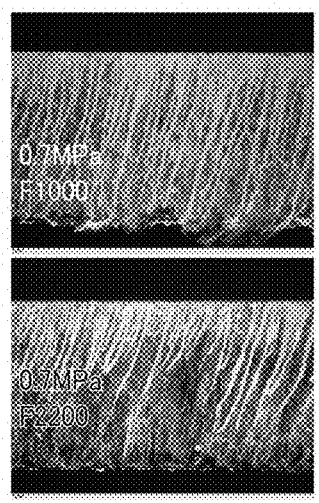

FIG. 17
ONE-MONTH EXPOSURE, PLATE THICKNESS t = 6.0mm,
FOCAL POSITION: -2.0mm
| PLATING QUANTITY | | K27 | | | | | K35 | | | | |
|---|---|---|---|---|---|---|---|---|---|---|---|
| NOZZLE DIAMETER (mm) | | D4.0 | | | D7.0 | | D4.0 | | | D7.0 | |
| ASSIST GAS PRESSURE (MPa) | | 1.2 | 0.9 | 0.7 | 1.2 | 0.9 | 1.2 | 0.9 | 0.7 | 1.2 | 0.9 |
| PLATE t = 6.0 | CUTTING SPEED mm/min 1000 | NIL× | NIL× | D× | P× | D× | NIL× | NIL× | D× | P× | D○ |
| | 1500 | NIL× | NIL× | D× | P× | D× | P× | NIL× | D× | P○ | D○ |
| | 1800 | NG | NIL× | NG | NG | NG | P× | NIL× | × | NG | NG |
| | 2000 | NIL× | NG | NG | NG | NG | NG | NG | NG | NG | NG |
(A) K27 D4.0
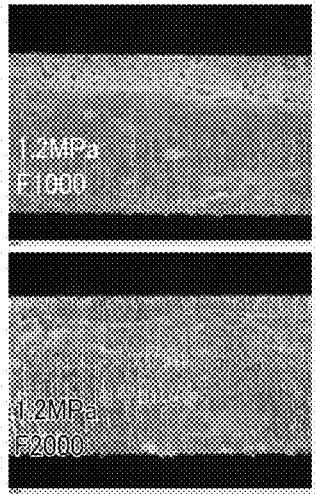
(C) K35 D4.0
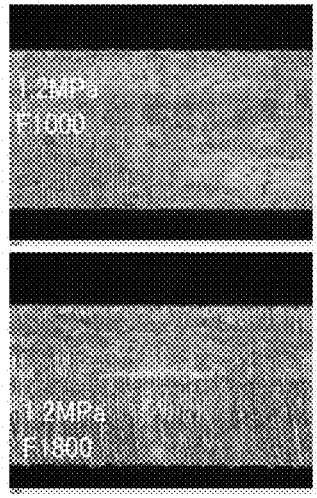
(B) K27 D7.0
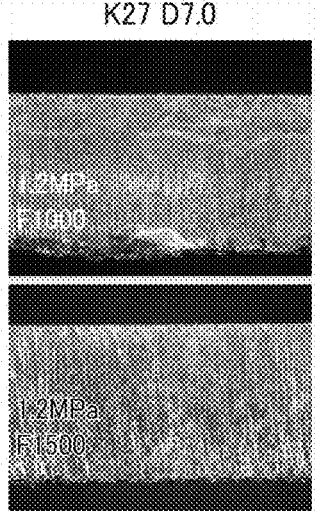
(D) K35 D7.0
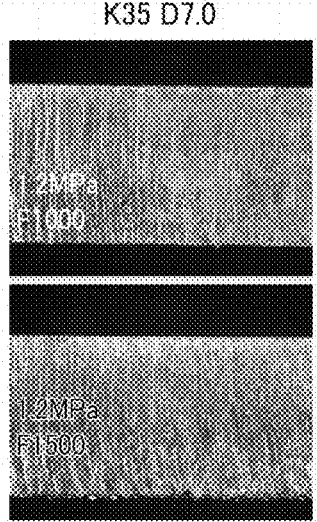

FIG. 18

PLATE THICKNESS t = 2.3mm

| PROCESS-ING SPEED | ASSIST GAS : N₂ | | | ASSIST GAS : N₂+O₂ | | |
|---|---|---|---|---|---|---|
| | K35, D7.0, 0.5MPa | K27, D4.0, 0.7MPa | K14, D4.0, 0.7MPa | K35, D7.0, 0.5MPa | K27, D4.0, 0.7MPa | K14, D4.0, 0.7MPa |
| F1000 | pO | O | × | PO | PO | p× |
| F2000 | PO | p× | × | PO | PO | P× |
| F3000 | PO | PO | PO | PO | PO | PO |
| F4000 | PO | PO | PO | PO | PO | PO |
| F5000 | PO | PO | PO | PO | PO | PO |

FIG. 19

PROCESSING VOLTAGE : 3kV   t = 2.3  K14

| PROCESSING SPEED | Fe | Zn | Al | Mg | EXPOSURE TEST RESULT (AFTER 4 WEEKS) |
|---|---|---|---|---|---|
| 2200 (mm/min) | % BY WEIGHT : 89.16 | NO PHOTO DUE TO MINUTE DETECTION<br>% BY WEIGHT : 1.45 | NO PHOTO DUE TO MINUTE DETECTION<br>% BY WEIGHT : 0.54 | NO PHOTO DUE TO MINUTE DETECTION<br>% BY WEIGHT : 0.36 | |
| 5000 (mm/min) | % BY WEIGHT : 32.48 | % BY WEIGHT : 43.57 | % BY WEIGHT : 4.02 | % BY WEIGHT : 2.19 | |

FIG. 27
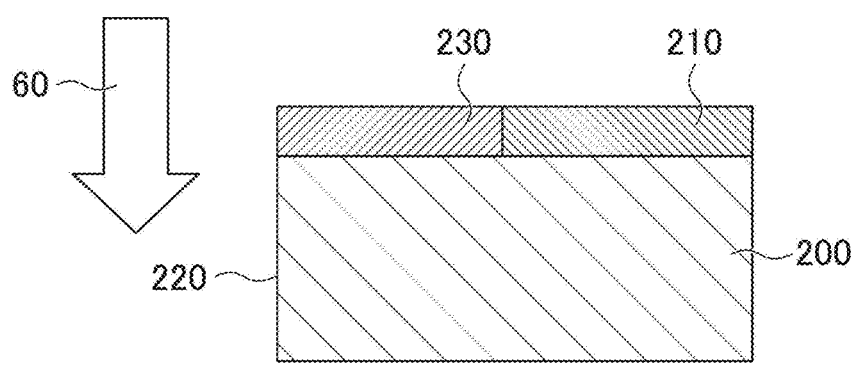
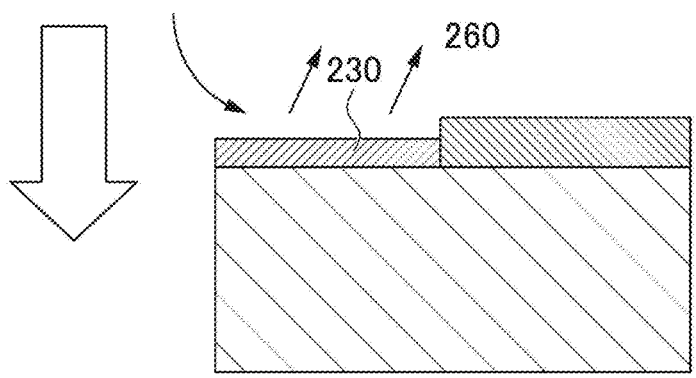

FIG. 30
(a)
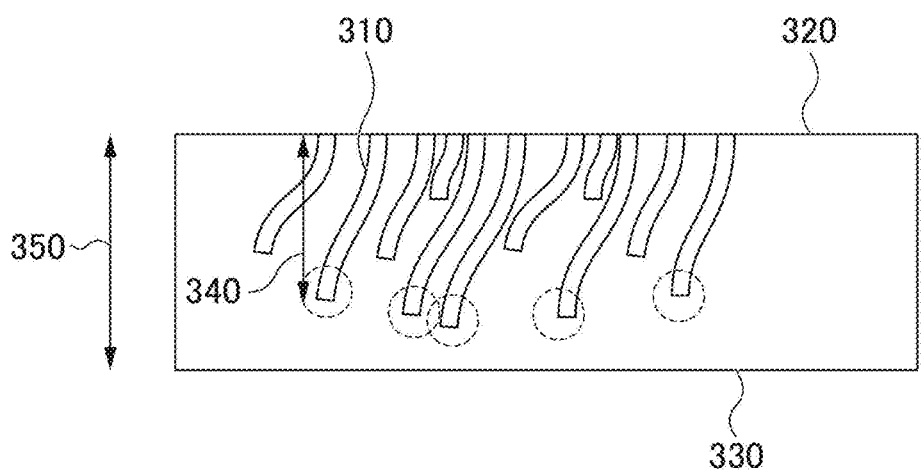
(b)
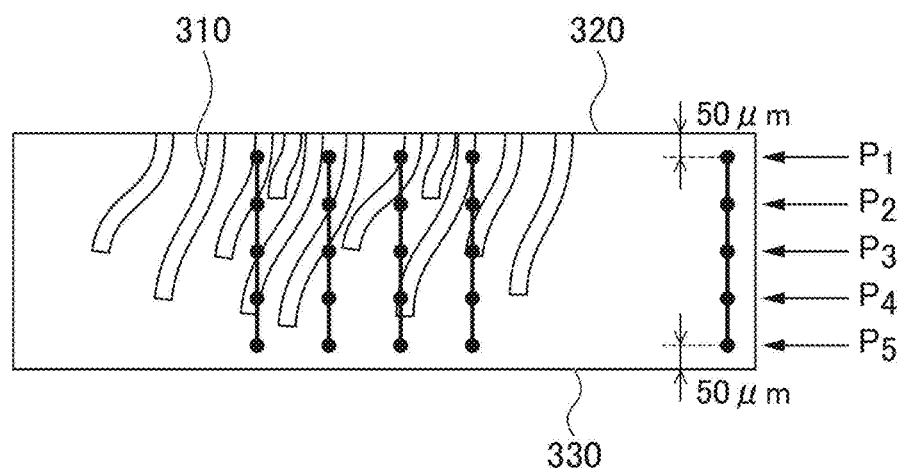

LASER CUTTING AND MACHINING METHOD FOR PLATED STEEL PLATE, LASER CUT-AND-MACHINED PRODUCT, THERMAL CUTTING AND MACHINING METHOD, THERMAL CUT-AND-MACHINED PRODUCT, SURFACE-TREATED STEEL PLATE, LASER CUTTING METHOD, AND LASER MACHINING HEAD

This is a divisional application of pending U.S. application Ser. No. 16/301,670, filed Nov. 14, 2018, which is a National Stage Entry of PCT/JP2017/018528, filed May 17, 2017, which claims the benefit of Japanese Patent Application No. 2017-095393, filed May 12, 2017, Japanese Patent Application No. 2016-099867, filed May 18, 2016 and Japanese Patent Application No. 2016-099292, filed May 18, 2016. The entire contents of each of the above-identified documents, including the specification, drawings and claims, is incorporated herein by reference in its entirety.

TECHNICAL FIELD

The present invention relates to a laser cutting and machining method for a plated steel plate, a laser cut-and-machined product, a thermal cutting and machining method, a thermal cut-and-machined product, a surface-treated steel plate, a laser cutting method, and a laser machining head. More precisely, it relates to a laser cutting and machining method for a plated steel plate, a laser cut-and-machined product, a thermal cutting and machining method, a thermal cut-and-machined product, a surface-treated steel plate, a laser cutting method, and a laser machining head in which when a plated steel plate is laser cut and machined, a laser beam is emitted to melt and/or evaporate plating-layer-containing metal of atop surface of the plated steel plate, and with an assist gas, the melted and/or evaporated plating-layer-containing metal is guided toward a cut face, thereby coating the cut face with the melted and/or evaporated plating-layer-containing metal, as well as relating to a laser cut-and-machined product, a thermal cutting and machining method, a thermal cut-and-machined product, a surface-treated steel plate, a laser cutting method, and a laser machining head.

BACKGROUND ART

Conventionally, a work such as a plated steel plate is laser cut and machined after removing a plated surface of the work (for example, refer to Patent Literature 1).

According to a configuration written in the Patent Literature 1, a plated surface of a work is removed, and thereafter, the work is cut and machined with a laser. This raises a problem in an improvement of efficiency of the work laser cutting and machining. According to the configuration mentioned in the Patent Literature 1, a cut face of the work after laser cutting is not coated with plating-layer-containing metal, and therefore, there is a problem that the cut face needs a proper surface treatment such as rustproofing.

PRIOR ART DOCUMENT

Patent Literature

Patent Literature 1: Japanese Unexamined Patent Application Publication No. H7-236984

SUMMARY OF THE INVENTION

Subjects to be solved by the present invention include a laser cutting and machining method that carries out laser cutting and machining on a plated steel plate such that melted and/or evaporated plating-layer-containing metal of a top surface of the plated steel plate flows toward and coat a cut face of the plated steel plate, as well as a laser cut-and-machined product.

In order to resolve the above-mentioned problems, the present invention provides a laser cutting and machining method for a plated steel plate. The method carries out laser cutting and machining by irradiating a top surface of the plated steel plate with a laser beam. At this time, the method jets an assist gas to a laser cutting part of the plated steel plate to guide plating-layer-containing metal of the top surface melted and/or evaporated by the laser beam toward a cut face of the plated steel plate so that the cut face is coated with the plating-layer-containing metal.

According to the laser cutting and machining method for a plated steel plate, a focal position of the laser beam is adjusted within a range of +0.5 mm to −4.5 mm.

According to the laser cutting and machining method for a plated steel plate, a nozzle gap between a nozzle of a laser machining head and the top surface of the plated steel plate is adjusted within a range of 0.3 mm to 1.0 mm and an assist gas pressure within a range of 0.5 MPa to 1.2 MPa.

According to the laser cutting and machining method for a plated steel plate, a laser cutting and machining speed is adjusted within a range of 1000 mm/min to 5000 mm/min.

According to the laser cutting and machining method for a plated steel plate, a diameter of an assist gas jetting nozzle is 2.0 mm to 7.0 mm.

According to the laser cutting and machining method for a plated steel plate, the assist gas is a nitrogen gas or a mixture of 96% or higher nitrogen gas and 4% or lower oxygen gas.

According to the laser cutting and machining method for a plated steel plate, a plate thickness is 2.3 mm, a plating quantity is K14, a nozzle diameter is 2.0 mm to 7.0 mm, an assist gas pressure is 0.5 to 0.9 (MPa), and a cutting speed is 3000 to 5000 (mm/min).

According to the laser cutting and machining method for a plated steel plate, a plate thickness is 2.3 mm, a plating quantity is K27 or K35, a nozzle diameter is 2.0 mm to 7.0 mm, an assist gas pressure is 0.5 to 0.9 (MPa), and a cutting speed is 3000 to 5000 (mm/min).

According to the laser cutting and machining method for a plated steel plate, a plate thickness is 3.2 mm, a plating quantity is K27 or K35, a nozzle diameter is 7.0 mm, an assist gas pressure is 0.5 to 0.9 (MPa), and a cutting speed is 2000 to 3000 (mm/min).

According to the laser cutting and machining method for a plated steel plate, a plate thickness is 4.5 mm, a plating quantity is K27 or K35, a nozzle diameter is 7.0 mm, an assist gas pressure is 0.7 to 0.9 (MPa), and a cutting speed is 1500 to 2000 (mm/min).

The present invention also provides a laser cut-and-machined product made from a plated steel plate, characterized in that a cut face of the plated steel plate is coated with plating-layer-containing metal of a top surface of the plated steel plate melted and/or evaporated at the time of laser cutting and machining.

According to the laser cut-and-machined product, a plating thickness around an upper edge of the cut face is thinner than a plating thickness at a position away from the cut face.

According to the laser cut-and-machined product, a plating melting range is within a range of 0.27 mm to 0.5 mm from the cut face.

BRIEF DESCRIPTION OF DRAWINGS

FIG. 2 shows EPMA analysis results of cut faces cut by oxygen cutting, clean cutting, and easy cutting.

FIG. 4 shows enlarged photos of coating states of plating-layer-containing metal on cut faces under different laser cutting and machining conditions.

FIG. 8 shows photos of plasma generating states.

FIG. 9 shows enlarged photos of corrosion resistance evaluation results of cut faces.

FIG. 10 shows a diagram of exposure test evaluation results and photos of plasma generation.

FIG. 11 shows a diagram of exposure test evaluation results and photos of plasma generation.

FIG. 12 shows a diagram of exposure test evaluation results and photos of plasma generation.

FIG. 13 shows a diagram of exposure test evaluation results and photos of plasma generation.

FIG. 14 shows a diagram of exposure test evaluation results and photos of plasma generation.

FIG. 15 shows a diagram of exposure test evaluation results and photos of plasma generation.

FIG. 16 shows a diagram of exposure test evaluation results and photos of plasma generation.

FIG. 17 shows a diagram of exposure test evaluation results and photos of plasma generation.

FIG. 18 is an explanatory diagram showing relationships between plasma generation and red rust occurrence based on exposure tests of clean cutting and easy cutting.

FIG. 19 shows photos of EDS analysis results and red rust occurrences based on different processing speeds.

FIG. 27 shows diagrams explaining a conventional formation of a plating metal layer, in which (a) shows a laser cutting start state of the plating metal layer and (b) shows a post-state of the plating metal layer.

FIG. 30 explains methods of measuring a coating layer, in which (a) shows a method of measuring a ratio (plating inflow length ratio) of a coating layer average length to a plate thickness and (b) shows a method of measuring a coverage (coating ratio) of a coating layer on a cut face.

DESCRIPTION OF EMBODIMENTS

Hereunder, embodiments according to the present invention will be explained with reference to the diagrams.

Figure 1:
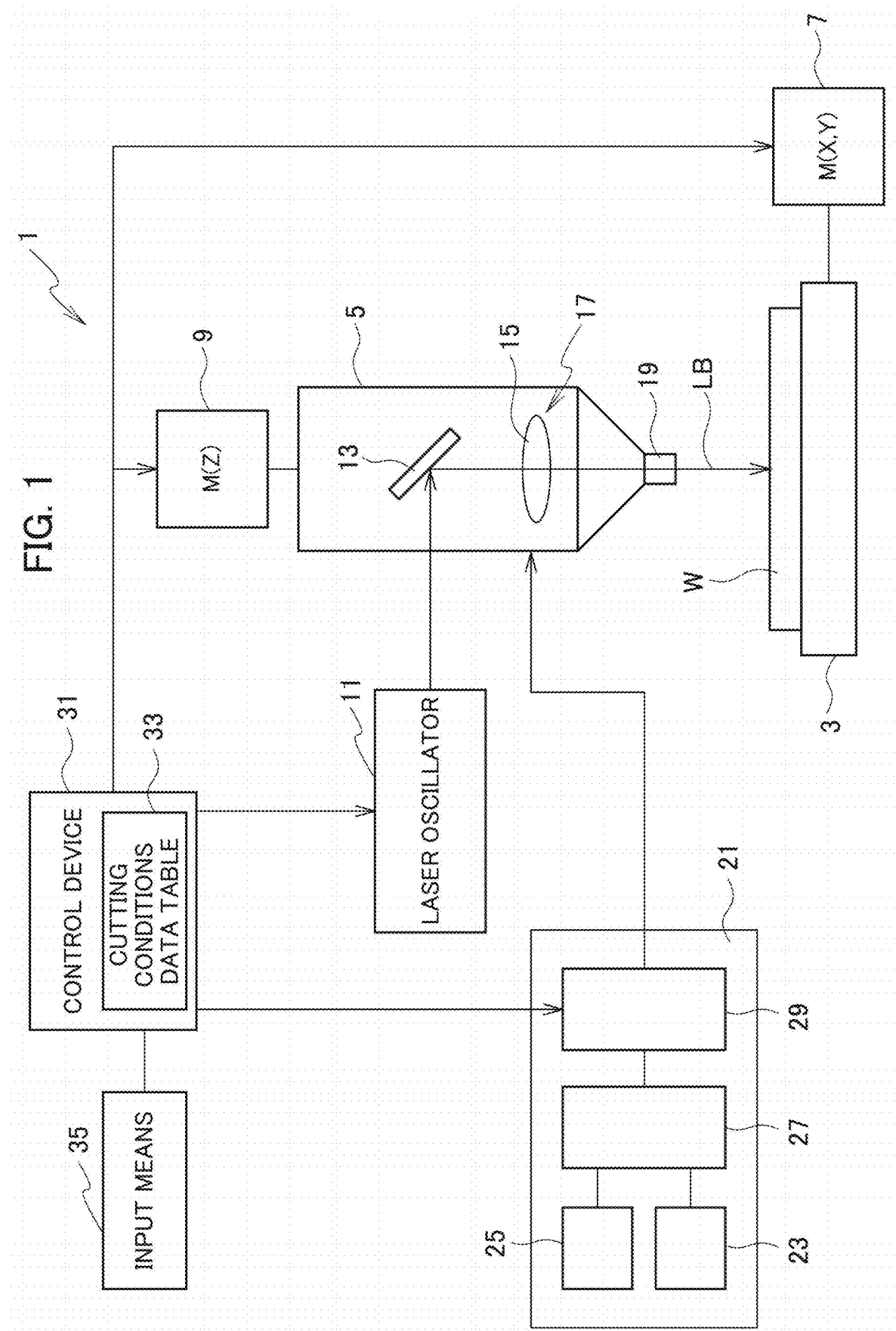
FIG. 1 is a configuration explanatory diagram schematically showing a configuration of a laser cutting and machining apparatus according to an embodiment of the present invention.

FIG. 1 is a configuration explanatory diagram schematically showing a configuration of a laser cutting and machining apparatus according to an embodiment of the present invention.

Referring to FIG. 1, the laser cutting and machining apparatus 1 according to an embodiment of the present invention has a work table 3 supporting a plate-like work W and a laser machining head 5 that irradiates the work W with a laser beam LB and cuts and machines the work W with the laser beam. The work table 3 is arranged to be movable in X- and Y-axis directions relative to the laser machining head 5. To relatively move and position the work table 3 in the X- and Y-axis directions, a positioning motor 7 such as a servomotor is arranged. Also arranged to move and position the laser machining head 5 relative to the work W in an approaching/distancing direction (Z-axis direction) is a Z-axis motor 9.

Further, the laser cutting and machining apparatus 1 has a laser oscillator 11 such as a $CO_2$ laser oscillator that oscillates a laser beam in a far-infrared wavelength range (a laser beam of 3 µm or more in wavelength). The laser machining head 5 has optical devices 17 such as a reflection mirror 13 that reflects the laser beam LB oscillated by the laser oscillator 11 toward the work W and a condenser lens 15 that condenses the laser beam LB. The laser machining head 5 also has a detachable and replaceable nozzle 19 that jets an assist gas to a laser cutting and machining position of the work W.

As a configuration to jet an assist gas to a laser cutting and machining position, it is possible to provide the laser machining head 5 with a side nozzle from which the assist gas is jetted toward a laser machining part.

The laser cutting and machining apparatus 1 further has an assist gas supply device 21. The assist gas supply device 21 supplies a mixed gas of, for example, approx. 97% nitrogen gas and approx. 3% oxygen gas and includes a nitrogen gas supply device 23, an oxygen gas supply source (air supply source) 25, and a mixer 27 to produce the mixed gas. Further, the assist gas supply device 21 has a pressure adjustment valve 29 that adjusts a pressure of the assist gas to be supplied to the laser machining head 5. If the oxygen gas supply source 25 of the assist gas supply device 21 is stopped and only the nitrogen gas supply device 23 is operated, only a nitrogen gas will be supplied as the assist gas to a part to be processed.

A configuration of supplying the mixed gas of approx. 97% nitrogen gas and approx. 3% oxygen gas as an assist gas to a laser processing part is not limited to the one mentioned above. Any other configuration is possible. For example, as stipulated in Japanese Patent Publication No. 3291125, it is possible to separate, by a separating device employing a hollow fiber membrane, nitrogen and oxygen from each other from compressed and supplied air. The laser cutting and machining employing, as an assist gas, the mixed gas of approx. 97% (96% or more) nitrogen and approx. 3% (4% or smaller) oxygen will simply be referred to as "easy cutting".

The laser cutting and machining apparatus 1 also has a control device 31. The control device 31 is a computer having a function of controlling the moving and positioning of the laser machining head 5 relative to the work W, a function of controlling a laser output of the laser oscillator 11, and a function of controlling a supplying pressure of the assist gas to the laser machining head 5.

With the above-mentioned configuration, the work W is set and positioned on the work table 3, and thereafter, the laser machining head 5 is moved and positioned in the X-, Y-, and Z-axis directions relative to the work W. The laser beam LB oscillated by the laser oscillator 11 is condensed through the condenser lens 15 to irradiate the work W. The assist gas supplied from the assist gas supply device 21 to the laser machining head 5 is jetted from the nozzle 19 toward a laser machining part of the work W, which is thus cut and machined.

Figure 21:
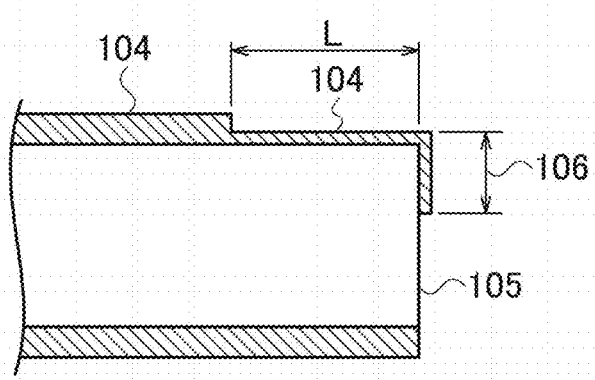
FIG. 21 is a model showing the definition of a melted plating width.

If the work W to be laser cut and machined is a plated steel plate, evaporated matter of a plating layer of the plated steel plate may enter a processed area as shown in FIG. 21 of the Patent Literature 1 and may cause processing quality defects. For this, the Patent Literature 1 stipulates that, as shown in FIG. 1 thereof, the surface of the plated steel plate is irradiated with a laser beam to remove the plating layer in advance, and thereafter, the laser cutting and machining is carried out along the same path.

According to this configuration, there is no plating evaporation during the laser cutting and machining, and therefore, the quality of processing may improve. However, it requires the plating layer removing process and cutting process, i.e., two times of laser processing. In addition, a cut face of the plated steel plate is left in the laser cut and machined state, and therefore, there is a problem of necessitating a rust-proofing process.

Embodiments of the present invention are based on findings that, when laser cutting and machining a plated steel plate, melting and/or evaporating a plating layer on a top surface of the plated steel plate causes melted and/or evaporated plating-layer-containing metal to flow to a cut face and that the flowed plating-layer-containing metal can coat the cut face.

According to an embodiment of the present invention, employed as an example of the plated steel plate is a hot-dipped steel plate (hereinafter, simply referred to as a "plated steel plate") that is a steel plate coated with a plating layer of 6% aluminum, 3% magnesium, and the remaining 91% zinc.

A laser cutting process generally carried out is oxygen cutting which uses an oxygen gas as an assist gas. According to an EPMA (Electron Probe Micro Analyzer) analysis, the oxygen cutting covers, as shown in FIG. 2, a cut face with an oxide film.

Next, a laser cutting and machining method employing a nitrogen gas as an assist gas (hereinafter, simply referred to as "clean cutting") demonstrates, depending on cutting conditions, a satisfactory laser cutting and machining result on a cut face CF of a base material B of a plated steel plate, as shown in enlarged photos of FIG. 3 (A). At around a top end part of the cut face CF, a plating layer M on the top surface is removed and is very thin. The cut face CF has no oxide film and the like and substantially shows only an original plate component (Fe) of the plated steel plate (refer to FIG. 2). A coating layer (plating layer) on the cut face CF is very thin. Consequently, the clean cutting is capable of, depending on proper cutting conditions, coating the cut face CF with melted plating-layer-containing metal of the top surface and sometimes causing no rust (red rust).

Figure 2:
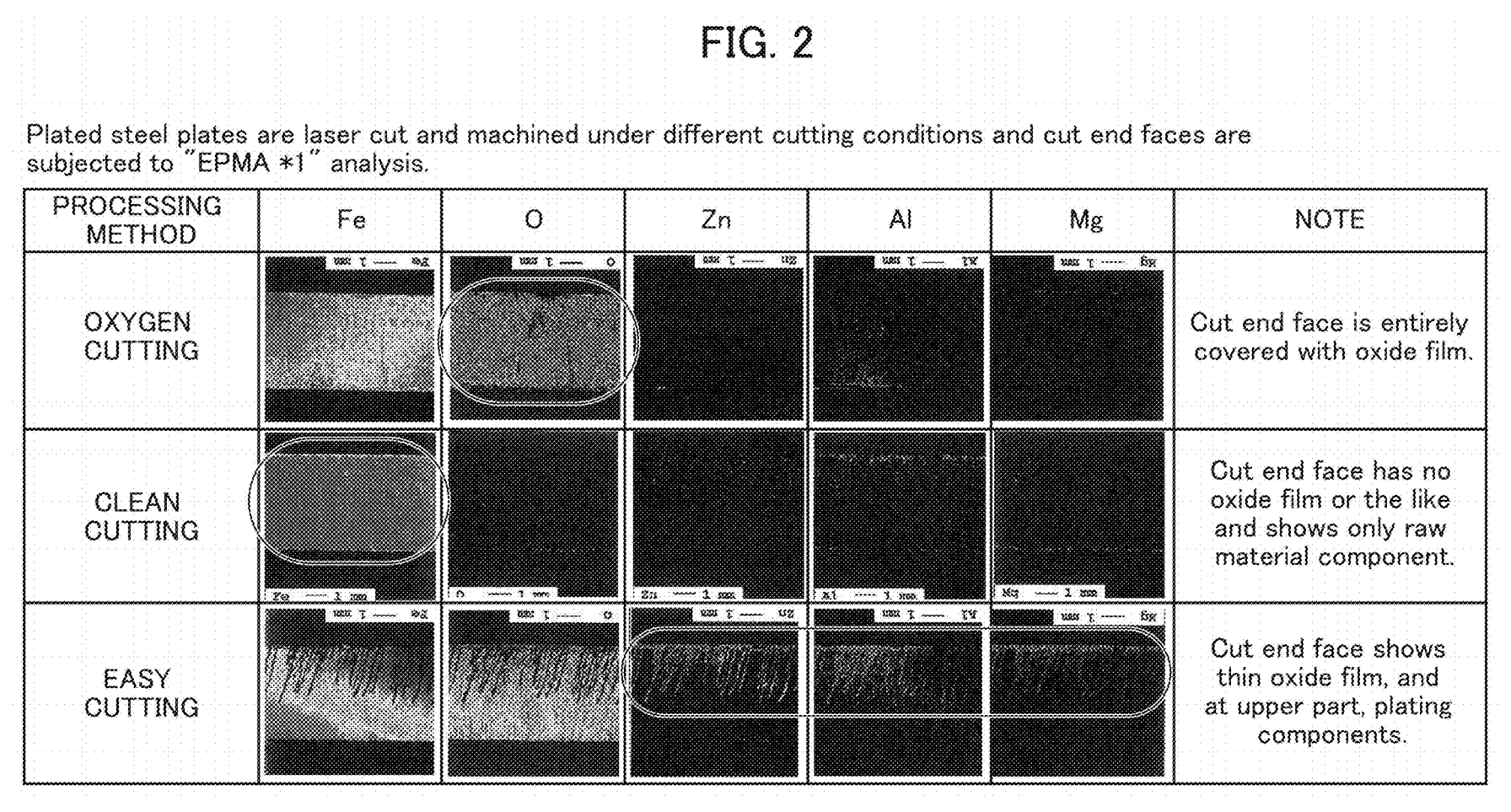
Figure 3:
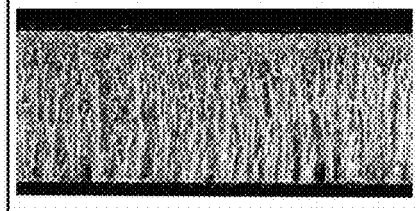
FIG. 3 shows enlarged photos of cut faces cut by clean cutting, oxygen cutting, and easy cutting.

Next, the easy cutting produces, as shown in FIGS. 2 and 3 (C), a thin oxide film appears on a cut face. At an upper part of the cut face, components of a plating layer M such as zinc, aluminum, and magnesium appear. Namely, at around the upper end part of the cut face CF, melted plating layer partly flows to the cut face CF to produce white strips with thick flows of the melted plating layer. Gaps among the strips show thin films of the melted plating layer.

Namely, it has been found that the clean cutting or easy cutting which is a generally adopted laser cutting and machining method for a steel plate is able to make metal contained in the plating layer M flow toward and coat the cut face CF of the plated steel plate (work) W.

For this, processing conditions such as a laser cutting speed, a condenser lens focal position, an assist gas pressure, and a laser beam pulse frequency are variously changed to test a plating layer coating state on a cut face. Test conditions are as mentioned below.

Laser cutting machine: Amada Co., Ltd. FOM2-3015RI
Material: Plated steel plate coated with plating of 6% aluminum, 3% magnesium, remaining 91% zinc, plate thickness t=2.3 mm, K35 (plating quantity 175 g/m² per face)
Cut sample shape: 130 mm×30 mm
Standard processing conditions
Nozzle diameter: D4.0 (4.0 mm)
Cutting speed: F1600 (1600 mm/min)
Assist gas type: EZ (an assist gas that is used for the above-mentioned easy cutting and is a mixed gas of about 97% nitrogen and 3% oxygen)
Assist gas pressure: 0.9 MPa
Nozzle gap: 0.3 mm (a gap between a nozzle and a top surface of a plated steel plate)
Focal position: −4.5 mm (work top surface being 0, upper side thereof being +, and lower side thereof being −)

Processing results obtained by changing these standard processing conditions are as mentioned below.

As is apparent from FIG. 4, when adjusting the cutting speed within a range of 1120 mm/min to 3840 mm/min, the plating metal coating amount on a cut face (cut end face) gradually increases as the cutting speed increases.

Figure 5:
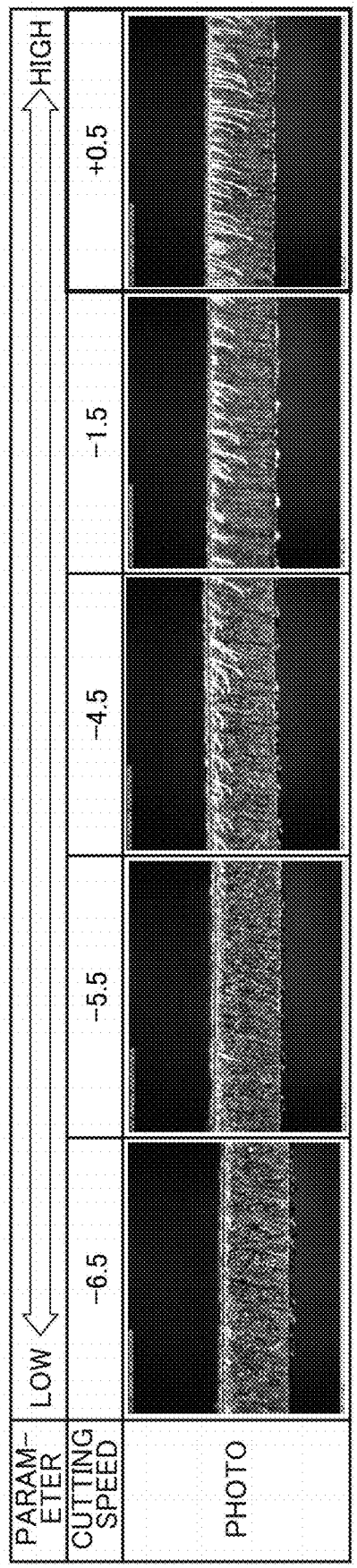
FIG. 5 shows enlarged photos of coating states of plating-layer-containing metal on cut faces under different laser cutting and machining conditions.

As is apparent from FIG. 5, when adjusting the condenser lens focal position within a range of −6.5 mm to +0.5 mm, the plating metal coating amount on a cut face gradually increases as the focal position is gradually adjusted to the + side.

Figure 6:
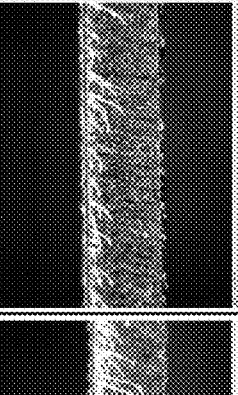
FIG. 6 shows enlarged photos of coating states of plating-layer-containing metal on cut faces under different laser cutting and machining conditions.

As shown in FIG. 6, when adjusting the assist gas pressure within a range of 0.5 MPa to 0.9 MPa, the plating metal coating amount on a cut end face gradually increases as the assist gas pressure is decreased.

Figure 7:
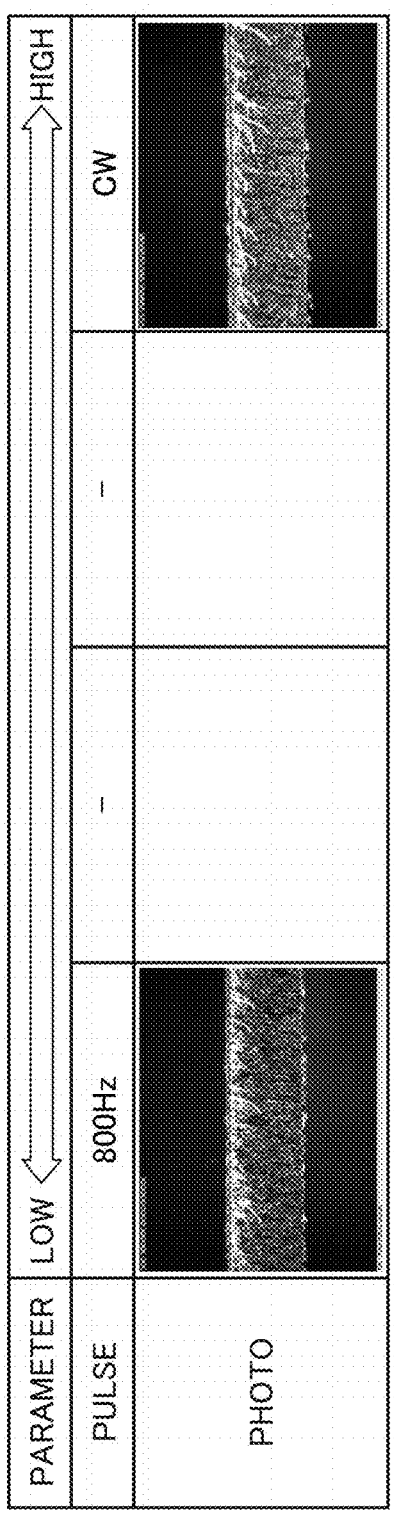
FIG. 7 shows enlarged photos of coating states of plating-layer-containing metal on cut faces under different laser cutting and machining conditions.

As shown in FIG. 7, when adjusting the laser beam pulse frequency within a range of 800 Hz to CW (continuous), the plating metal coating amount on a cut end face shows no significant change.

The results shown in FIGS. 4 to 7 tell that, in the easy cutting, the plating-layer-containing metal coating amount on a laser cut face of a plated steel plate increases as the cutting speed becomes higher (for example, 3840 mm/min). As the focal position moves to the + side (for example, +0.5 mm), the plating-layer-containing metal coating amount increases. However, greatly moving the focal position to the + side results in lowering an energy density on the top surface of a plated steel plate, and therefore, it is preferable in the laser cutting and machining, to set the same on the − side. As the assist gas pressure decreases (for example, 0.5 MPa), the plating-layer-containing metal coating amount increases. Adjusting the laser beam between pulsatory and continuous causes no significant change in the plating metal coating amount.

As will already be understood, when conducting the easy cutting (EZ) to cut and machine a plated steel plate with a laser, varying laser cutting and machining conditions such as the cutting speed, condenser lens focal position, and assist gas pressure results in changing a plating-layer-containing metal coating amount on a laser cut face of the plated steel plate. Varying the laser cutting and machining conditions may include changing a gap between the nozzle 19 of the laser machining head and the top surface of the work W, i.e., a nozzle gap.

Namely, it is understood that the plating-layer-containing metal coating amount on a laser cut face of a plated steel plate is dependent on the laser cutting and machining conditions on the plated steel plate. In other words, the easy cutting of a plated steel plate, if carried out under proper laser cutting conditions, is able to properly coat a laser cut face with plating-layer-containing metal.

It has been found that the easy cutting is able to coat a cut face of a plated steel plate with plating-layer-containing metal.

Next, in order to find out proper cutting conditions for the clean cutting, various cutting conditions are applied to laser cut and machine plated steel plates, and in order to observe red rust occurring states on laser cut faces, an exposure test is carried out. The exposure test holds upward the cut face of a laser cut-and-machined plated steel plate and leaves the same as it is in the open air for one month.

When the clean cutting is carried out to cut a plated steel plate into a laser cut-and-machined product, there are, as shown in FIG. 8, a case to cause plasma on a top surface of a laser cut-and-machined position and a case to cause no plasma. In the case of causing plasma, a weak plasma generation and a strong (not weak) plasma generation are visually distinguishable from each other. The case of no plasma generation is classified as "Nil", weak plasma generation as "p", and strong plasma generation as "P". If the cutting conditions are improper to accomplish the laser cutting and machining, it is classified as "NG".

Figure 9:
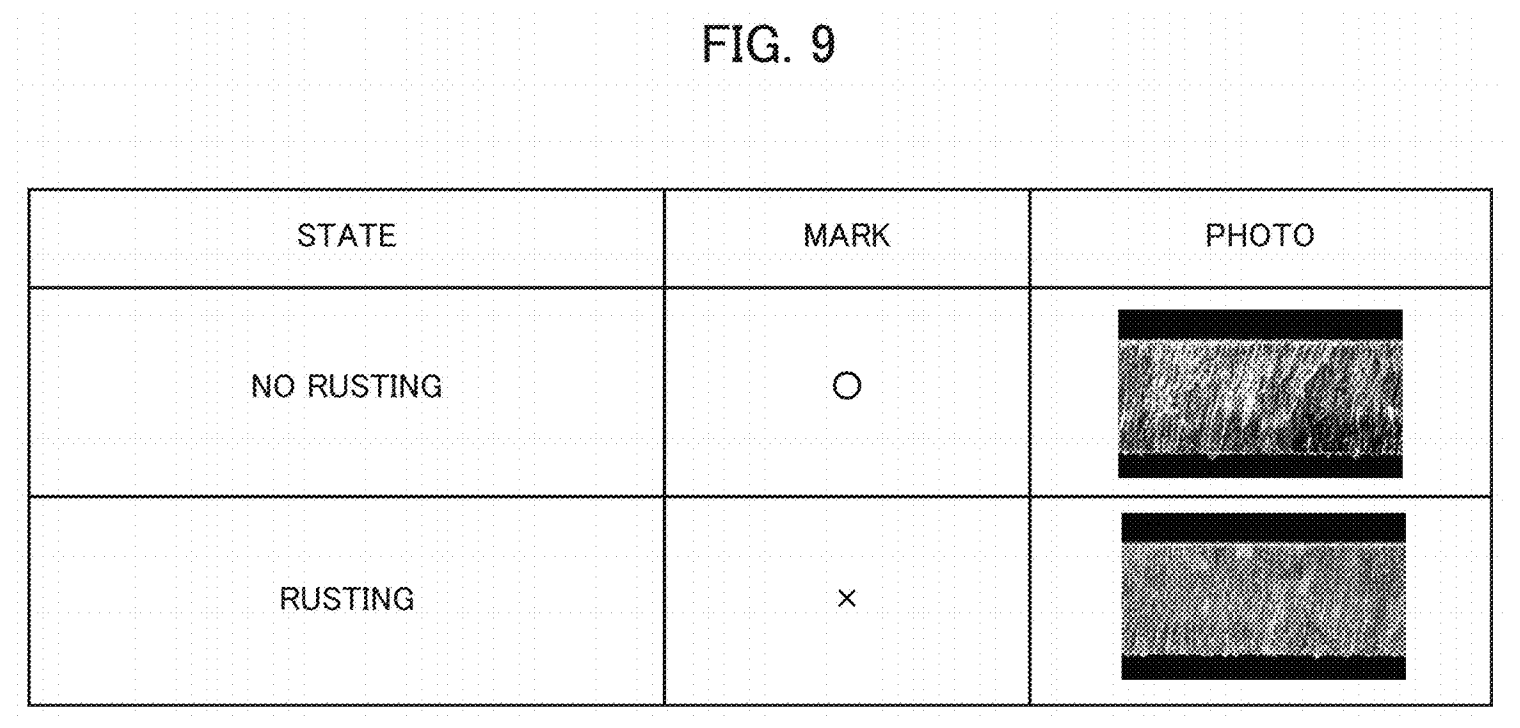

In the one-month exposure test, no red rust occurrence is represented with "O" and red rust occurrence with "X" as shown in FIG. 9. The exposure test is a result of one month passage in the open air. Accordingly, some of the laser cut-and-machined products evaluated as "X" are usable depending on environments of use.

Next, the clean cutting with a nitrogen gas as an assist gas is carried out on plated steel plates having plate thicknesses t=2.3 mm, t=3.2 mm, t=4.5 mm, and t=6.0 mm and the exposure test is carried out on them. Results of the tests are as shown in FIGS. 10 to 17. In FIGS. 10 to 17, K14, K27, and K35 each are a plating quantity indicator. They are K14 (per-face plating quantity 70 g/m$^2$), K27 (per-face plating quantity 145 g/m$^2$), and K35 (per-face plating quantity 175 g/m$^2$).

In FIGS. 10 to 17, S indicates a single nozzle and D a double nozzle (dual nozzle). The double nozzle is already known as stipulated in, for example, Japanese Unexamined Patent Application Publication No. H11-90672. S2.0, D4.0, and D7.0 each indicate a nozzle diameter (mm). Namely, S2.0=2.0 mm, D4.0=4.0 mm, and D7.0=7.0 mm. Corresponding to the nozzle diameters, nozzle gaps are set as 0.3 mm for S2.0, 0.5 mm for D4.0, and 1.0 mm for D7.0. Namely, as the nozzle diameter increases, spatters and the like produced at a laser processing position easily enter into the nozzles, and therefore, the nozzle gap is set to become larger as the nozzle diameter increases.

Laser processing parameters other than those particularly mentioned are the same as those of the above-mentioned standard processing conditions.

Referring to FIG. 10, the focal position is −0.5 mm (the focal position is shown in each diagram), the plate thickness is t=2.3 mm, and the plating quantity is K14. When the nozzle diameter is S2.0, no plasma occurs at 1000 mm/min under the assist gas pressures of 0.9 MPa, 0.7 MPa, and 0.5 MPa. The exposure test results are each "X" to indicate an entire red rust occurrence. As shown in FIGS. 11, 12, 13, 14, and 15, at the cutting speed of 1000 mm/min, the nozzle diameter of S2.0 produces no plasma without regard to the assist gas pressures. The exposure test results are "X" to indicate an undesirable rust proofing effect on each cut face.

Accordingly, it is difficult for the laser cutting and machining of a plated steel plate with the nozzle diameter of S2.0 at the cutting speed of 1000 mm/min to make melted and/or evaporated plating-layer-containing metal flow toward and coat a cut face.

In FIGS. 10, 11, and 12, the cases with the nozzle diameter D4.0 will be examined. In FIGS. 10 and 11, there is no plasma generation and the exposure test results are "X". In FIG. 11, however, the case with the assist gas pressure 0.7 MPa improves to "O". The cases with the nozzle diameter D7.0 show weak plasma generation. The exposure test results are "X" in FIG. 10, "O" and "X" in FIG. 11, and "X" in FIG. 12.

In FIGS. 10 to 17, among the exposure test results of "O" and "X", the cases with the plasma generation (P) are almost "O". Accordingly, it is preferable to generate plasma when laser cutting and machining a plated steel plate by the clean cutting, in order to make melted and/or evaporated plating-layer-containing metal flow to and coat a cut face.

As is apparent from FIG. 11, the cases with the plating quantity K27 and nozzle diameter D4.0 include one with no plasma generation and "O" in the exposure test result. In FIG. 10, the cases with the nozzle diameter D7.0 and assist gas pressure 0.9 MPa include those with slight plasma generation and "X" in the exposure test results.

In FIGS. 10, 11, and 12, the cases with the cutting speed in a range of 3000 mm/min to 5000 mm/min each generate plasma and the plasma generation becomes stronger as the cutting speed increases. In FIG. 10, all of the cases except those with the nozzle diameter S2.0 and the assist gas pressures 0.9 MPa and 0.7 MPa (3000 mm/min) are "O" in the exposure test results. In FIG. 10, the cases with the nozzle diameter S2.0 mm, assist gas pressure 0.7 MPa, and 4000 mm/min to 5000 mm/min are "O".

Therefore, the exposure test result of "O" is obtainable for the plated steel plate thickness t=2.3 mm, plating quantity K14, and nozzle diameter S2.0 if the assist gas pressure is 0.7 MPa and the cutting speed in the range of 4000 mm/min to 5000 mm/min. For the assist gas pressure 0.5 MPa, the range of 3000 mm/min to 5000 mm/min is preferable. For the nozzle diameter of D4.0 or D7.0, it is preferable to set the cutting speed in the range of 3000 mm/min to 5000 mm/min without regard to the assist gas pressure of 0.9 MPa, 0.7 MPa, or 0.5 MPa.

As shown in FIG. 11, increasing (thickening) the plating quantity to K27 on the same plated steel plate thickness (t=2.3 mm) with the nozzle diameter D4.0, assist gas pressure 0.7 MPa, and cutting speed 1000 mm/min provides the evaluation "O" even without plasma generation. Accordingly, properly harmonizing the conditions of the plated steel plate thickness (t=2.3 mm), plating quantity K27, nozzle diameter D4.0, assist gas pressure 0.7 MPa, and cutting speed 1000 mm/min is able to provide the evaluation "O" even without plasma generation. In other words, properly setting the above-mentioned conditions results in making plating-layer-containing metal melted and/or evaporated during the laser cutting and machining flow to and coat a cut face even if no plasma is generated.

Referring to FIG. 12, only the plating quantity is changed to K35. At the cutting speed 1000 mm/min, the case with the nozzle diameter D4.0 and assist gas pressure 0.7 MPa and the cases with the nozzle diameter D7.0 and assist gas pressures 0.9 MPa and 0.7 MPa show slight plasma generation but are evaluated as "X".

Generally, if plasma is generated in the laser cutting and machining of a metal plate, the plasma has a characteristic to absorb a laser beam and irradiation of the laser beam promotes continuous plasma generation. The plasma is known to worsen a cut face roughness. However, there is a plasma cutting method such as a stainless steel non-oxidation cutting method that uses plasma heat. In this case, processing conditions are set to promote the growth of generated plasma.

In this case, (i) the assist gas is set to a low pressure, (ii) the nozzle gap between the nozzle and a work is slightly extended than a normal case, to form a space for growing plasma, (iii) the focal position is moved toward the (+) direction than a normal focal position, where (+) is an upward direction above a work surface and (−) is a downward direction below the work surface, and (iv) the cutting speed is increased to reduce a laser beam heat gain of the work. These conditions (i) to (iv) promote plasma generation when laser cutting and machining a metal plate.

Considering these conditions (i) to (iv), FIG. 10 will be examined. At the plating quantity K14 and in a cutting speed range of 1000 mm/min to 2000 mm/min, the nozzle diameter D4.0 than S2.0 and the nozzle diameter D7.0 than D4.0 generate more plasma. As the cutting speed gradually increases from 1000 mm/min to 5000 mm/min, the plasma generation becomes stronger. As the plasma generation becomes stronger, the exposure test results involve more "O". The same tendencies are also observed in FIGS. 11 and 12.

Accordingly, it is better at the laser cutting and machining of a plated steel plate to generate plasma to make melted and/or evaporated plating-layer-containing metal of the top surface of the plated steel plate flow to and coat a cut face.

FIGS. 13, 14, and 15 are exposure test results of the clean cutting under the conditions of a plated steel plate thickness t=3.2 mm and plating quantities K14, K27, and K35. In FIGS. 13 to 15, "NG" indicates a cutting impossibility, i.e., improper cutting conditions. As is apparent from the results shown in FIGS. 13 to 15, lower assist gas pressures and higher cutting speeds tend to easily generate plasma.

FIGS. 16 and 17 are exposure test results of the clean cutting with plate thicknesses t=4.5 mm and t=6.0 mm. These cases also show that lowering the assist gas pressure, i.e., enlarging the nozzle diameter and increasing the cutting speed tend to strengthen plasma generation. As the plasma generation becomes stronger, the exposure test results tend to show "O". In FIGS. 16 and 17, "D" indicates that a dross deposition amount is large.

The exposure test results shown in FIGS. 10 to 17 are stored in a cutting conditions data table 33 provided for the control device 31. Namely, the cutting conditions data table 33 stores, for each plated steel plate thickness, processing conditions data such as nozzle diameters adopted for plating quantities, a nozzle gap for each nozzle diameter, a focal position, and cutting speeds. Further, the cutting conditions data table 33 stores plasma generation data at the time of laser cutting and machining of plated steel plates and exposure test results. The control device 31 also includes a cutting conditions data table that stores cutting conditions data for the easy cutting.

When various processing conditions are inputted through an input means 35 connected to the control device 31, the laser cutting and machining that provides the same results as those shown in FIGS. 10 to 17 is carried out. For example, if the conditions for the plate thickness t=2.3 mm shown in FIG. 10 such as the plating quantity K14, nozzle diameter D4.0, assist gas pressure 0.7 MPa, and cutting speed 5000 mm/min are inputted through the input means 35 into the control device 31, plasma will be generated and the laser cutting and machining will be carried out accordingly. Then, the one-month exposure test to be carried out thereafter will provide the evaluation result "O".

The exposure test result may vary depending on environmental and meteorological conditions such as seaside conditions.

To laser cut a plated steel plate work and make melted and/or evaporated plating-layer-containing metal flow toward and coat a cut face, a preferable melting range of plating is 0.27 mm to 0.5 mm from a cut end face of the work, although it is dependent on a work plate thickness, a plating quantity, and laser cutting conditions.

If the plating layer melting and/or evaporating range is equal to or greater than 0.5 mm, the laser cutting speed will slow and a heat gain will be large. In this case, it is understood that a melted and/or evaporated plating metal amount increases to increase an inflow to a laser cut face. It is understood, however, that the slow laser cutting speed extends a laser beam irradiation time, i.e., a heating time to keep the melted and/or evaporated plating-layer-containing metal at high temperatures for a longer time and extend an assist gas acting time, thereby easily blowing off the melted and/or evaporated plating-layer-containing metal before the same solidifies on the cut face, thus reducing a coating amount of the melted and/or evaporated plating-layer-containing metal on the cut face (refer to, for example, D4.0 and D7.0 of FIG. 12).

If the melting and/or evaporating range of a plating layer is as small as 0.27 mm, the laser cutting speed will be high and the heat gain will be small. In this case, it is understood that the melted and/or evaporated plating metal amount is small to decrease an inflow to a laser cut face.

Accordingly, it is preferable that the plating layer melting and/or evaporating range is 0.27 mm to 0.5 mm from a cut face. Within this range, the laser beam irradiation time and assist gas acting time are appropriate to reduce the melted and/or evaporated plating metal amount blown off by the assist gas. This may result in easily coating a cut face with the melted and/or evaporated plating metal and solidifying the same at there, thereby increasing the plating-layer-containing metal coating amount (refer to, for example, D4.0 and D7.0 in FIG. 12).

As is already understood, the laser cutting and machining of a plated steel plate according to the clean cutting employing a nitrogen gas as an assist gas or the easy cutting employing a mixed gas of about 97% nitrogen and about 3% oxygen as an assist gas is able to coat a cut face with plating-layer-containing metal of a top surface of the plated steel plate. It has been found that plasma generation during the laser cutting and machining effectively carries out the coating.

The clean cutting and easy cutting are carried out on plated steel plates having a plate thickness t=2.3 mm and the plasma generation observation and one-month exposure test are conducted. Results are shown in FIG. 18.

The results shown in FIG. 18 suggest that each of the clean cutting and easy cutting is able to, if plasma is generated during the laser cutting, effectively coat a cut face with plating-layer-containing metal and prevent the occurrence of red rust.

As the processing speed increases, the plating-layer-containing metal more effectively coats a cut face and prevents the occurrence of red rust. At processing speeds 2200 mm/min and 5000 mm/min, plated steel plates having a plate thickness t=2.3 mm and plating quantity K14 are laser cut. Observation results of cut faces thereof are shown in FIG. 19.

As is apparent from FIG. 19, the processing speed 2200 mm/min causes red rust. At the processing speed 5000 mm/min, however, plating-layer-containing metal components are detected on an entire cut face and no red rust is observed. These results agree with the results shown in FIG. 18.

From EDS (Energy Dispersive X-ray Spectrometry) analysis results and exposure test results (after four weeks) of the laser cut faces shown in FIG. 19, the followings are understood. According to the clean cutting of FIG. 2, a very small amount of plating-layer-containing metal is detected on a laser cut face. The EDS analysis of the laser cut face cut at the processing speed 2200 mm/min that is nearly equal to the clean cutting condition of FIG. 2 shows that plating-layer-containing metal components such as Zn, Al, and Mg are less than photographable quantities and are substantially not coating the laser cut face. When the cutting conditions are changed to proper ones, as is apparent in the EDS analysis result photographs at the processing speed 5000 mm/min in FIG. 19, the plating-layer-containing metal is detected allover the laser cut face to suggest that the laser cut face is entirely coated with the plating-layer-containing metal. Namely, the cut face cut under a normal condition (processing speed: 2200 mm/min) shows about 90% iron (Fe weight percent: 89.16) and no detectable plating components (Zn, Al, and Mg each being equal to or less than 1.45 weight percent). Due to this, red rust easily occurs. On the other hand, the processing condition of this time (processing speed: 5000 mm/min) indicates that the iron on a cut face drastically decreases to about 30% (Fe weight percent: 32.48), Zn greatly increases to 43.57 weight percent, Al and Mg increase several times, and the plating components entirely cover the cut face. It is understood, therefore, that the occurrence of red rust is suppressed by the plating components that flow from a top surface of the plated steel plate during the laser cutting and machining and cover the surface of the cut face.

As is understood from the embodiment explained above, if the laser cutting and machining of a plated steel plate is carried out under proper conditions based on the thickness and plating quantity of the plated steel plate, melted and/or evaporated plating-layer-containing metal of a top surface of the plated steel plate flows to a cut face during the laser cutting and machining and easily coats the cut face. Accordingly, the thickness of a plating layer around a top edge of the cut face of the plated steel plate is thinner than the thickness of a plating layer at a position away from the cut face, i.e., a position that is thermally not affected so that the playing layer may not melt, evaporate, or flow during the laser cutting and machining.

The plated steel plate examples mentioned in the above explanation contain 6% aluminum, 3% magnesium, and the remaining 91% zinc. Plated steel plates are not limited to them and other kinds of plated steel plates are applicable.

Next, a second embodiment will be explained.

This embodiment employs, as a raw material, a surface-treated steel plate coated with plating metal on the surface of a steel plate, cuts the raw material by a gas cutting method or a thermal cutting method using light energy or electric energy, and provides surface-treated steel plates used for automobiles, house appliances, power distribution facilities, and communication facilities.

Conventionally, parts (surface-treated steel plates) used for automobiles, house appliances, power distribution facilities, communication facilities, and the like are made by cutting a cold-rolled steel plate into required sizes and carrying out hot-dip plating (post-plating) on them. In recent years, to improve corrosion resistance and durability and reduce processes to save costs, widely used are parts that employ a surface-treated steel plate as a raw material to omit the post-plating. The surface-treated steel plate is frequently a plated steel plate that is a steel plate whose surface is coated with metal such as Zn, Zn alloy, Al, Al alloy, and Cu. A most general method of cutting such a surface-treated steel plate is to employ a press machine or punching with a mold conforming to the shape of a part. To suppress the cost of the mold, a thermal cutting method is increasingly used. The thermal cutting method is typically gas cutting, laser cutting using a laser beam that is light energy, or plasma cutting using plasma that is electric energy. In the case of using a cut part as it is, the cutting method employing light energy or electric energy is frequently adopted because it causes little damage on the plating metal of a surface-treated steel plate and provides a cut face having a good appearance.

A related patent literature is Japanese Unexamined Patent Application Publication No. 2001-353588.

Usually, a process of thermally cutting a surface-treated steel plate into an optional shape with the use of light energy or electric energy forms a thickness-direction cut face where top and bottom plating layers are removed to expose a steel base. As a result, the cut face has a low rustproofing ability, and depending on a placed environment, quickly causes red rust. The red-rusted part has a poor appearance and corrodes to reduce volume to raise a problem of unsatisfying a required strength. The problem is serious in a thicker item because the rusted appearance easily catches attention and because the rust affects strength. To cope with this, a prior art applies, after the thermal cutting, a repairing paint, which has components similar to the plating metal components, to the cut face. This raises another problem of adding the costs of paint and painting process, thereby increasing the cost of the product.

A conventional thermal cutting method for a plated steel plate is proposed in the patent literature mentioned above. This method employs, as an assist gas, a mixed gas of 2 to 20% oxygen and nitrogen to improve a cutting efficiency. According to an embodiment thereof, a zinc-plated steel plate of 3 mm thick is cut under an assist gas pressure of 12 bar (1.2 MPa) and a cutting speed of 1.8 m/min. However, as will be explained with reference to the embodiment, a cut face of a surface-treated steel plate cut according to the conventional method has insufficient plating components, and therefore, achieves a poor rustproofing ability.

The second embodiment has been devised to resolve the above-mentioned problems and an object thereof is to cut, as a raw material, a surface-treated steel plate coated with plating metal by a thermal cutting method utilizing light energy or electric energy such that plating-layer-containing metal covers a cut face to secure a rustproofing ability for the cut face.

The second embodiment employs a surface-treated steel plate as a raw material to form a thermally cut part and secures a rustproofing ability on a cut face without repair painting by making plating-layer-containing metal melted by thermal cutting flow to the cut face.

Adopted as the surface-treated steel plate is a plated steel plate coated with Zn, Zn alloy, or the like.

Namely, the surface-treated steel plate having a plating layer is a steel plate whose surface is coated with plating metal. Plating-layer-containing metal on the surface of the steel plate melts, flows to a cut face, and solidifies to cover the cut face, thereby providing a thermally cut product having an excellent cut-face corrosion resistance.

In the above, the raw material may be a hot-dip Zn-based plated steel plate having a plating composition of 0.1 to 22.0% Al in weight percent. Also, it may be a hot-dip Zn-based plated steel plate containing one or more selected from a group of 0.1 to 10.0% Mg, 0.10% or lower Ti, 0.05% or lower B, and 2% or lower Si. Also, the raw material may adopt alloyed Zn plating.

The second embodiment is able to provide a cut product with a rustproofing ability of at least one month or more, and due to no necessity of repair painting on a cut face after cutting, involves no paint cost nor painting process.

The cut product according to the second embodiment is characterized as the plating-layer-containing metal of a raw material, i.e., in which a surface-treated steel plate is present on a thermally cut face. Namely, the plating-layer-containing metal of a part of the steel plate surface covers the cut face. The surface-treated steel plate is not limited to a particular kind. In consideration of corrosion resistance and damages on coating components during thermal cutting, it is preferable to use a plated steel plate coated with Zn or Zn alloy. A source plate of the surface-treated steel plate is not particularly limited. It may be a hot-rolled steel plate or a cold-rolled steel plate. A steel type may be extra-low carbon steel or low carbon steel. A plate thickness and plating quantity are also not particularly limited. They may be determined in consideration of corrosion resistance and strength required for thermally cut parts. For example, if the corrosion resistance is important, the quantity of plating will be increased to increase the quantity of plating-layer-containing metal flowing to a cut face at the time of thermal cutting.

A thermal cutting method for manufacturing a thermally cut part employs light energy or electric energy in consideration of appearance of a cut face. The light energy cutting method includes $CO_2$ laser cutting, YAG laser cutting, and fiber laser cutting. The electric energy cutting method includes plasma cutting and arc cutting. The second embodiment produces a thermally cut part by employing the above-mentioned cutting method to melt plating-layer-containing metal on the surface of a steel plate around a cut area at the time of cutting and by using an assist gas to flow the melted plating-layer-containing metal into a cut face. Flowing easiness of the melted plating-layer-containing metal to the cut face varies depending on cutting conditions such as a heat gain and an assist gas pressure at the time of cutting. If the heat gain is too high, the melted plating-layer-containing metal will evaporate before flowing to the cut face. If the heat gain is too low, the plating-layer-containing metal will insufficiently melt, or the cutting of the steel plate will not be completed. If the assist gas pressure is too high, the plating-layer-containing metal flowing to the cut face will excessively be blown off.

Conditions of a surface-treated steel plate serving as a raw material also affect the rustproofing ability of a cut face. As the quantity of plating increases, a ratio of melting plating-layer-containing metal to a given heat gain at the time of thermal cutting increases. As a plate thickness becomes thinner, the area of a cut face to be coated with plating-layer-containing metal becomes smaller. Due to these reasons, the raw material conditions that affect the flowing of plating-layer-containing metal to a cut face and improve a rustproofing ability are a larger plating quantity and a thinner plate thickness.

The inventers of the present invention have found that combinations of these cutting conditions and raw material conditions realize conditions to easily pass plating-layer-containing metal to a cut face at the time of thermal cutting. Based on such conditions, the inventors have completed cut parts that have an improved cut face rustproofing characteristic.

Embodiment 1

Hereunder, an embodiment of the present invention will be explained.

Raw materials employed are, as shown in Table 1, a Zn-6% Al-3% Mg-plated steel plate, a Zn-plated steel plate, and an Al-plated steel plate. A facility employed is a most widely used $CO_2$ laser to cut the steel plates under combinations of various conditions shown in Table 2.

TABLE 1

| Plating type | Zn-6% Al-3% Mg, Zn, Al |
|---|---|
| Plating quantity per face | 60 to 175 g/m$^2$ |
| Plate thickness | 2.3 to 3.2 mm |

TABLE 2

| Cutting speed | 1.4 to 3.0 m/min |
|---|---|
| Pulse output | 4 to 5 kW |
| Nozzle diameter | φ2 to 4 mm |
| Nozzle gap | 0.3 mm |
| Assist gas type | $N_2$, $N_2$ + 3 Vol % $O_2$ |
| Assist gas pressure | 0.5 to 1.2 MPa |
| Beam diameter | φ0.2 to 0.3 mm |

Figure 20:
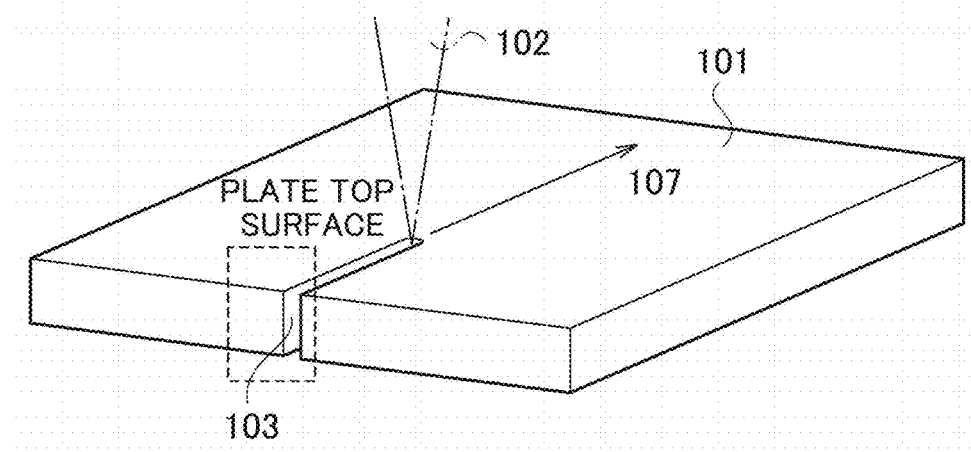
FIG. 20 is a model showing a laser cutting state.
Figure 22:
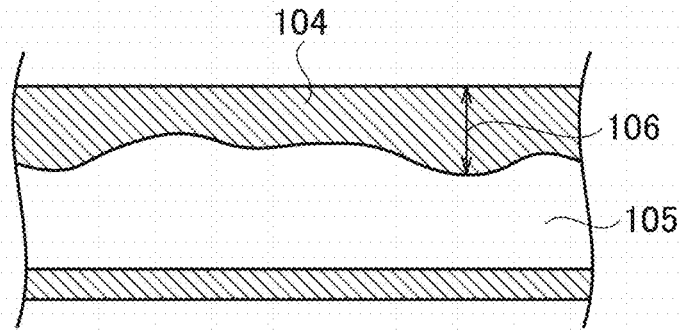
FIG. 22 is a model showing the definition of a plating metal coating state on a cut face.

FIG. 20 shows a raw material to be cut. A top surface side to receive a laser beam in a dashed-line area causes partial melting of a plating layer of the raw material, and after cutting, the melted part of the plating layer becomes thinner than an original thickness of the plating layer due to evaporation or flowing to a cut face . In connection with this, a melted plating width L shown in FIG. 21, i.e., the width of an area in which the plating layer is thinned is examined on the top surface of the raw material. As shown in FIG. 22, a coating state of plating-layer-containing metal on the cut face is observed to examine a ratio of a plating-layer-containing metal coating area to a cut face area and a ratio of a maximum inflow distance of the plating-layer-containing metal (a maximum inflow size of the plating-layer-containing metal from the top surface of the raw material, i.e., the surface-treated steel plate along the cut face) to a plate thickness. Each cut sample is subjected to an outdoor exposure test to measure the number of days until visible rust occurs and see if the number of days exceeds one month.

Results thereof are shown in Table 3. Cut products having a melted plating width L of 0.27 mm to 0.5 mm and a melted plating-layer-containing metal coating area ratio of 10% or greater or a plating-layer-containing metal maximum flow distance to plate thickness ratio of 30% or greater each demonstrate a rustproofing ability of one month or longer.

As a comparison, a cut face cut according to conditions (No. 19 of Table 3) stipulated in the patent literature (Japanese Unexamined Patent Application Publication No. 2001-353588), i.e., a cutting speed of 1.8 m/min and an assist gas pressure of 12 bar (1.2 MPa) is examined. The melted plating width thereof exceeds the range of the second embodiment and no one-month rustproofing ability is observed.

TABLE 3

| No. | Plating type | Plating quantity per face | Plate thickness (mm) | Cutting speed (m/min) | Pulse output (kW) | Nozzle diameter (mm) | Nozzle gap (mm) | Assist gas (O$_2$: 3%) |
|---|---|---|---|---|---|---|---|---|
| 1 | a | 70 | 2.3 | 3.0 | 4 | 4.0 | 0.3 | N$_2$ |
| 2 | a | 70 | 2.3 | 3.0 | 4 | 4.0 | 0.3 | N$_2$ + O$_2$ |
| 3 | a | 70 | 2.3 | 1.6 | 4 | 2.0 | 0.3 | N$_2$ |
| 4 | a | 70 | 2.3 | 1.6 | 4 | 2.0 | 0.3 | N$_2$ + O$_2$ |
| 5 | b | 60 | 3.2 | 2.0 | 5 | 4.0 | 0.3 | N$_2$ |
| 6 | b | 60 | 3.2 | 1.4 | 5 | 2.0 | 0.3 | N$_2$ |
| 7 | c | 60 | 3.2 | 1.4 | 5 | 2.0 | 0.3 | N$_2$ + O$_2$ |
| 8 | a | 70 | 3.2 | 1.4 | 5 | 2.0 | 0.3 | N$_2$ |
| 9 | a | 70 | 3.2 | 1.4 | 5 | 2.0 | 0.3 | N$_2$ + O$_2$ |
| 10 | a | 145 | 3.2 | 2.0 | 5 | 4.0 | 0.3 | N$_2$ |
| 11 | a | 145 | 3.2 | 2.0 | 5 | 4.0 | 0.3 | N$_2$ + O$_2$ |
| 12 | a | 145 | 3.2 | 1.4 | 5 | 2.0 | 0.3 | N$_2$ |
| 13 | a | 145 | 3.2 | 1.4 | 5 | 2.0 | 0.3 | N$_2$ + O$_2$ |
| 14 | a | 175 | 3.2 | 2.0 | 5 | 4.0 | 0.3 | N$_2$ |
| 15 | a | 175 | 3.2 | 2.0 | 5 | 4.0 | 0.3 | N$_2$ + O$_2$ |
| 16 | a | 175 | 3.2 | 1.4 | 5 | 2.0 | 0.3 | N$_2$ |
| 17 | a | 175 | 3.2 | 1.4 | 5 | 2.0 | 0.3 | N$_2$ + O$_2$ |
| 18 | a | 175 | 3.2 | 1.8 | 5 | 4.0 | 0.3 | N$_2$ + O$_2$ |
| 19 | b | 60 | 3.2 | 2.0 | 5 | 2.0 | 0.3 | N$_2$ |
| 20 | a | 70 | 2.3 | 2.0 | 4 | 2.0 | 0.3 | N$_2$ + O$_2$ |

| No. | Assist gas pressure (MPa) | Beam diameter (mm) | Focal position (mm) | Melted plating width L(mm) | Plating coverage (%) | Max ratio of plating inflow length to plate thickness (%) | One-month corrosion resistance | Remarks |
|---|---|---|---|---|---|---|---|---|
| 1 | 0.5 | 0.2 | 0.5 | 0.32 | 69 | 64 | ○ | Invention |
| 2 | 0.5 | 0.2 | 0.5 | 0.36 | 73 | 48 | ○ | Invention |
| 3 | 0.9 | 0.2 | 0.5 | 0.53 | 27 | 23 | x | Prior art |
| 4 | 0.9 | 0.2 | 0.5 | 0.57 | 16 | 17 | x | Prior art |
| 5 | 0.6 | 0.3 | 0.5 | 0.27 | 77 | 40 | ○ | Invention |
| 6 | 0.9 | 0.3 | 0.5 | 0.63 | 9 | 31 | x | Prior art |
| 7 | 0.9 | 0.3 | 0.5 | 0.72 | 12 | 26 | x | Prior art |
| 8 | 0.9 | 0.3 | 0.5 | 0.66 | 28 | 29 | x | Prior art |
| 9 | 0.9 | 0.3 | 0.5 | 0.70 | 9 | 21 | x | Prior art |
| 10 | 0.6 | 0.3 | 0.5 | 0.37 | 73 | 68 | ○ | Invention |
| 11 | 0.6 | 0.3 | 0.5 | 0.36 | 69 | 52 | ○ | Invention |
| 12 | 0.9 | 0.3 | 0.5 | 0.61 | 13 | 26 | x | Prior art |
| 13 | 0.9 | 0.3 | 0.5 | 0.63 | 28 | 29 | x | Prior art |
| 14 | 0.6 | 0.3 | 0.5 | 0.39 | 57 | 38 | ○ | Invention |
| 15 | 0.6 | 0.3 | 0.5 | 0.40 | 61 | 45 | ○ | Invention |
| 16 | 0.9 | 0.3 | 0.5 | 0.68 | 22 | 38 | x | Prior art |
| 17 | 0.9 | 0.3 | 0.5 | 0.64 | 38 | 34 | x | Prior art |
| 18 | 1.2 | 0.3 | 0.5 | 0.72 | 18 | 20 | x | Prior art |
| 19 | 0.9 | 0.3 | 0.5 | 0.45 | 9 | 31 | ○ | Invention |
| 20 | 0.9 | 0.2 | 0.5 | 0.50 | 16 | 17 | ○ | Invention |

Plating type;
a Zn—6% Al—3% Mg,
b Zn,
c Al

When a surface-treated steel plate that is a steel plate whose surface is coated with plating metal is cut and machined, there is provided a surface-treated steel plate having a cut face coated with metal contained in the plating layer of the surface of the steel plate. In this case, it is preferable that an area on the cut face coated with the plating-layer-containing metal of the steel plate surface is 10% or more of an area of the cut face and the coat by the plating-layer-containing metal of the steel plate surface extends from the top or bottom surface of the surface-treated steel plate for 30% or more of a plate thickness. It is also preferable that the width of a thin part of the plating layer perpendicularly to the cut face is 0.27 mm to 0.5 mm.

In FIGS. 20 to 22, a reference numeral 101 indicates the raw material, 102 the laser beam, 103 the cut face, 104 the plating metal, 105 the cut face, 106 the maximum inflow distance of the plating-layer-containing metal, and 107 an advancing direction of the laser beam.

Next, a third embodiment will be explained.

The third embodiment relates to a member having an excellent corrosion resistance. A surface-treated steel plate coated with plating metal is adopted as a raw material and is cut by laser into the member. It also relates to a laser cutting method for such a member.

Conventionally, members used for automobiles, house appliances, power distribution facilities, communication facilities, and the like are made by cutting a cold-rolled steel plate into given dimensions and thereafter by entirely plating (post-plating) the cut steel plate. In recent years, to improve the corrosion resistance and durability of members and save costs by reducing manufacturing processes, a surface-treated steel plate is widely used as a raw material to omit the post-plating when making such members. The surface-treated steel plate is mainly a plated steel plate that is made by coating the surface of a steel plate with metal such as Zn, Zn alloy, Al, Al alloy, and Cu. A method of cutting such a surface-treated steel plate into a member generally employs a press machine or punching that uses a mold conforming to the shape of the member. To suppress the cost of such a mold, a thermal cutting method is increasingly adopted. The thermal cutting method is gas cutting that burns a gas, laser cutting that uses a laser beam, or plasma cutting that uses heat plasma. The laser cutting is frequently used because it causes little damage on the plating metal of a surface-treated steel plate and provides a cut face with a good appearance.

A laser cutting method for a plated steel plate is proposed in, for example, a patent literature (Japanese Unexamined Patent Application No. 2001-353588). This method employs, as an assist gas, a nitrogen-oxygen mixed gas containing 2 to 20% oxygen, to improve a cutting efficiency.

When a surface-treated steel plate is cut into an optional shape by laser cutting, a cut face along a plate thickness direction generally exposes a steel base. Such a cut face has a low corrosion resistance, to quickly produce red rust depending on an environment of use and exhibit a bad appearance. A product with red rust reduces its volume due to corrosion to lack a required mechanical strength.

Since red rust on a thick product is apparently conspicuous and since a thick product is required to have a practical mechanical strength, the above-mentioned problems are serious on thick products. To cope with this, a related art applies, after laser cutting a product, a repairing paint having a function similar to that of plating metal to a cut face of the product, in order to secure a corrosion resistance for the product. This countermeasure needs a paint and painting work to increase the cost of the product.

The third embodiment has been devised to solve such problems and an object thereof is to provide a member that uses a surface-treated steel plate coated with plating metal as a raw material and secures a corrosion resistance for a laser cut face. Another object is to provide a laser cutting method to manufacture such a member.

The inventors of the present invention have made diligent studies to achieve the objects and found a phenomenon that, when laser cutting a plated steel plate, a plating metal layer on the surface of the steel plate melts due to laser radiation heat and flows toward a cut face. This finding has led to the completion of the embodiment. What is provided by the embodiment will be explained in more detail.

(1) The third embodiment is a laser cutting method for a surface-treated steel plate having a plating metal layer on the surface of a steel plate, the method carrying out laser cutting with the use of a cutting gas such as an oxygen gas, a nitrogen gas, or a mixed gas thereof to form a cut face and impinging an auxiliary gas to melted plating metal layer to make the melted plating metal layer flow to the cut face.

(2) The third embodiment is the laser cutting method as mentioned in (1), which arranges a plurality of nozzles for jetting the auxiliary gas around a nozzle for the cutting gas and carries out the laser cutting.

(3) The third embodiment is the laser cutting method as mentioned in (1), which arranges a ring-shaped nozzle for jetting the auxiliary gas around a nozzle for the cutting gas and carries out the laser cutting.

According to the third embodiment, the cut face is partly covered with the plating metal layer so that a sacrificial anode effect may secure corrosion resistance allover the cut face. The cut face after the laser cutting needs no repair painting unlike the related art, thereby reducing manufacturing costs.

Figure 23:
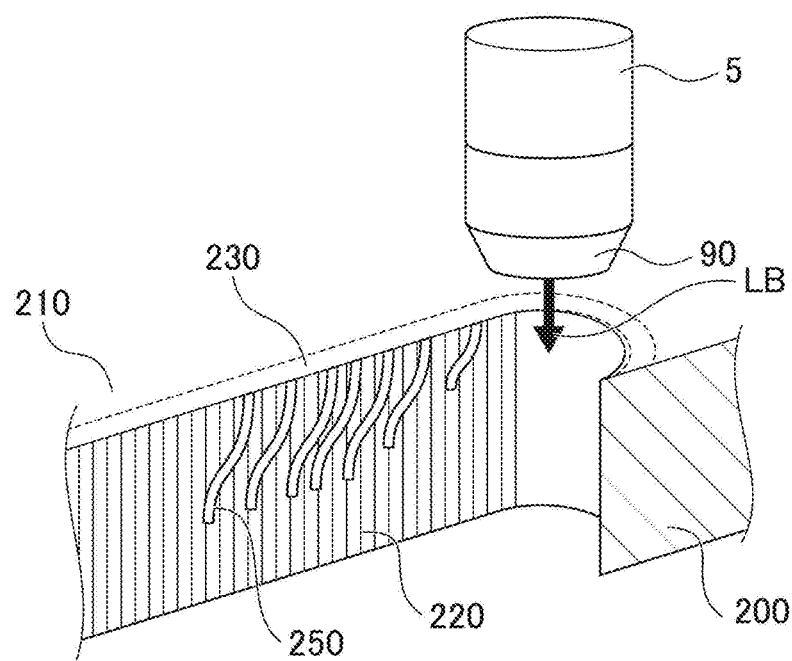
FIG. 23 is a diagram explaining an inflow state of a plating metal layer at laser cutting.

The laser cutting process is carried out as shown in FIG. 23. To the surface of a surface-treated steel plate 200, a laser machining head 5 emits a laser beam LB, which is moved to melt and cut the surface-treated steel plate 200 into a predetermined shape. The surface of the surface-treated steel plate 200 is coated with a plating metal layer 210 which evaporates around a cut face 220 (cut part) heated by the emitted laser beam LB. At the time of laser cutting, the plating metal layer in a region around the cut part is also heated by heat conduction of the laser beam. The plating metal (for example, Zn-based and Al-based) has low melting and evaporating points, and therefore, a plating metal layer 230 in the region melts and partly evaporates. The melted plating metal layer 230 has fluidity, and therefore, flows toward and onto the cut face, spreads over the cut face, and cools down to solidify, thereby forming a coating layer 250 containing the plating metal. The formation of the coating layer 250 containing the plating metal secures corrosion resistance on the cut face like the surface-treated steel plate, thereby producing a member having an excellent end-face corrosion resistance. Without repair painting on the cut face after the laser cutting, a proper corrosion resistance can be secured. As shown in FIG. 23, the coating layer 250 includes a part that continuously spreads from the plating metal layer 210.

Laser cutting is usually carried out in such a way as to emit a laser beam from a front end of an irradiation nozzle toward a cut material, and at the same time, jet a cutting gas (assist gas) from around the laser beam toward the cut material. The cutting gas is used to expel an evaporated or melted material from a cut part. The inventors of the present invention have found that jetting an auxiliary gas toward a peripheral area of the cut part during the laser cutting promotes a flow of melted plating metal to a cut face due to a flow of the auxiliary gas. This embodiment arranges an auxiliary gas nozzle around a cutting gas nozzle, to jet an auxiliary gas to the peripheral area of a cut part during laser cutting.

(Surface-Treated Steel Plate)

A surface-treated steel plate to be used is not particularly limited. It may be a plated steel plate plated with Zn-based, Zn—Al-based, Zn—Al—Mg-based, Zn—Al—Mg—Si-based metal or an alloy thereof. A steel plate plated with a Zn—Al—Mg-based alloy is preferable. A base material of the surface-treated steel plate may be a hot-rolled steel plate, a cold-rolled steel plate, an extra-low carbon steel plate, or a low carbon steel plate.

The thickness, plating layer Zn percentage, and plating quantity per face of the surface-treated steel plate are not particularly limited. They may be selected from within proper ranges in consideration of corrosion resistance and mechanical strength. The plating layer Zn percentage is preferably 40% or greater, more preferably, 80% or greater to improve corrosion resistance. In the case of, for example, Zn—Al—Mg-based alloy plating, a preferable Zn percent by weight is 80 or greater in terms of corrosion resistance. If the Zn—Al—Mg-based alloy plating contains a large amount of Mg, the viscosity and surface tension thereof decrease when it melts, to increase fluidity. This is preferable because it promotes a flow to a cut face.

If a surface-treated steel plate having a large plating quantity per face is selected, the laser beam cutting causes a larger amount of plating metal to flow to a cut end face, thereby realizing a good corrosion resistance. Accordingly, the plating quantity per face on a laser beam irradiation side is preferably 20 g/m$^2$ or more, more preferably, 30 g/m$^2$ or more or 90 g/m$^2$ or more.

As a ratio of the plating quantity per face to a plate thickness (a ratio of plating quantity/plate thickness) increases, a ratio of a plating metal inflow coating layer to a cut end face increases. Accordingly, the ratio of a plating quantity per face (g/m$^2$) to a plate thickness (mm), i.e., the ratio of plating quantity/plate thickness is preferably 1.3×10 or more, more preferably, 2.5×10 or more.

(Coating Layer)

A plating metal layer to be formed as a coating layer on a cut face of a surface-treated steel plate is satisfactory if it wholly or partly covers the cut face. If the plating metal layer is partly present on the cut face, the plating metal on the cut face melts prior to a base material, i.e., steel of the cut face due to the sacrificial anode effect, thereby securing corrosion resistance for the cut face. To secure a satisfactory corrosion resistance, an average length of the coating layer on the cut face is preferably 25% or more of the thickness of the steel plate. In this specification, the length of the coating layer on a cut face is referred to as a "plating inflow length" and the ratio of a coating layer average length to a steel plate thickness as a "plating inflow length ratio".

This specification calls a coating layer occupying ratio on a cut face a "coverage". The coverage is preferred to be 10% or more. If the coverage is less than 10%, the plating metal inflow is unable to secure a sufficient corrosion resistance.

(Oxide Layer, Nitride Layer, or Mixed Layer of Them)

In laser cutting, a cutting gas is blown from around a laser beam toward a surface-treated steel plate. The cutting gas is mainly used to expel burned, evaporated, or melted material from a cut part. The cutting gas may be an $O_2$ gas, air, an $N_2$ gas, or a mixed gas of them. An oxide layer, a nitride layer, or a mixed layer thereof is formed on the surface of a cut face that is exposed when cutting the surface-treated steel plate with a laser beam. At this time, a plating metal layer of the surface-treated steel plate flows to the cut face and forms the above-mentioned coating layer. Accordingly, the coating layer is formed on the oxide layer, nitride layer, or mixed layer (hereinafter sometimes referred to as an "oxide layer or the like"). If an auxiliary gas of the same kind as the cutting gas is used, it will contribute to the formation of the oxide layer and the like.

The melted plating metal flowed to the cut face tends to spread and move over the surface of the cut face. It is understood, therefore, that the oxide layer or the like acts to improve wettability between the melted plating metal and the cut face. Accordingly, the cut face on which the oxide layer or the like is formed promotes the formation of the coating layer and increases the plating metal layer coverage.

(Laser Cutting Method)

The third embodiment is a laser cutting method for a surface-treated steel plate coated with a plating metal layer on the surface of a steel plate. The method conducts laser cutting with the use of a cutting gas such as an oxygen gas, a nitrogen gas, or a mixed gas thereof to form a cut face and jets an auxiliary gas toward a melted plating layer to make it flow onto the cut face.

Figure 24:
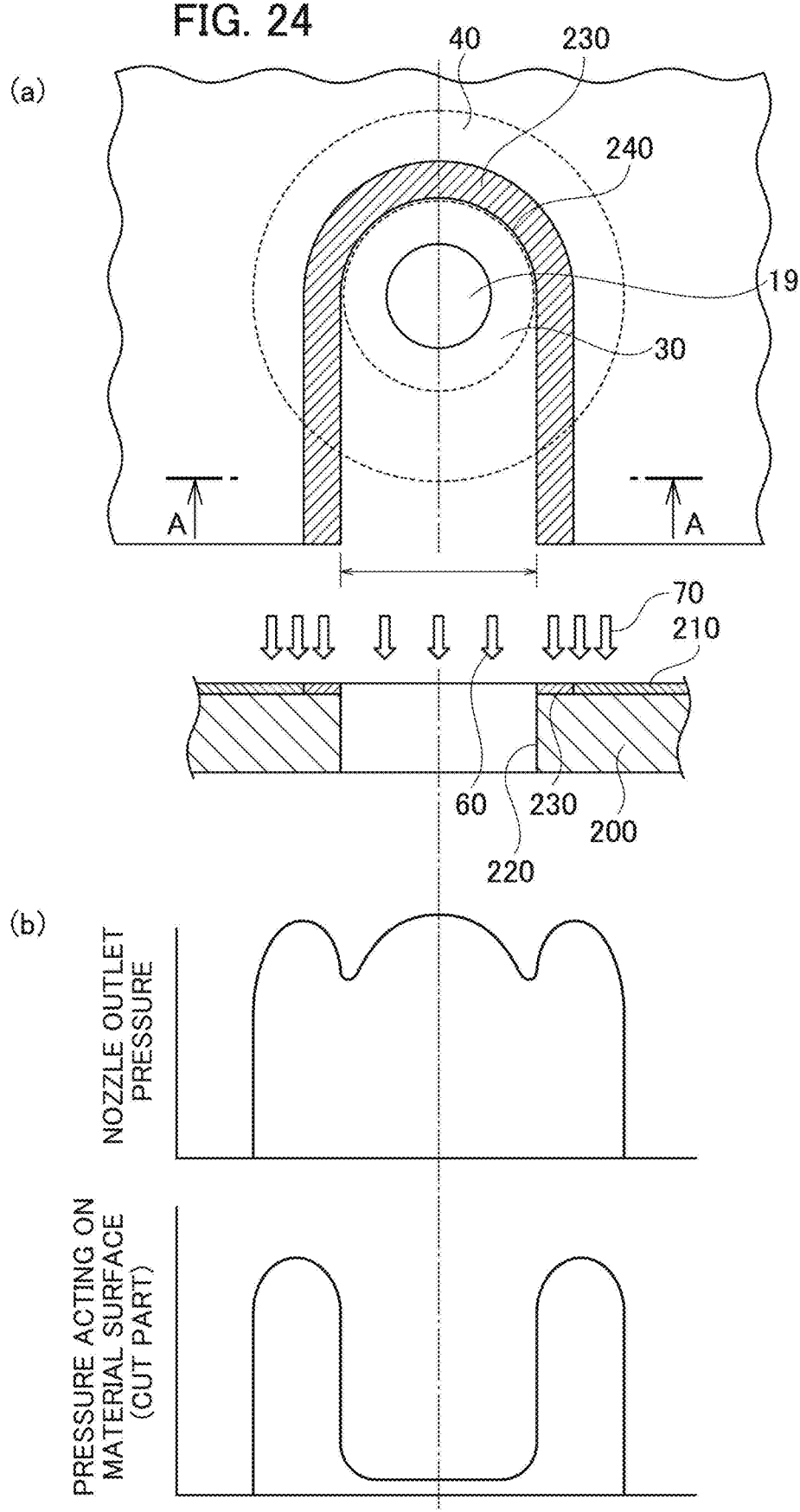
FIG. 24 shows diagrams explaining a laser cutting configuration according to an embodiment of the present invention, in which (a) shows a relationship among a laser beam, a cutting gas nozzle, and a material to be cut and (b) shows pressure distributions of a cutting gas and an auxiliary gas acting on the material to be cut.

As mentioned above, a laser beam melts a plating metal layer on the surface of a steel plate. At this time, the auxiliary gas is impinged toward a peripheral area of the cut part, so that a flow of the auxiliary gas promotes the flowing of the melted plating metal toward the cut face. A nozzle for jetting the auxiliary gas may be arranged around a nozzle for the cutting gas. FIG. 24(a) is a sectional diagram showing a laser cutting nozzle as an example of such an arrangement. Schematically shown in the diagram is a relationship among an emitted laser beam, a jetted cutting gas, and a jetted auxiliary gas. Around a laser beam emission nozzle 19, a cutting gas nozzle (cutting gas supply means 30) for jetting the cutting gas is arranged, and around this nozzle, a nozzle (auxiliary gas supply means 40) for jetting the auxiliary gas is arranged. The cutting gas jetted from the cutting gas supply nozzle 30 acts on an area including the cut face 220. On the other hand, the auxiliary gas 70 jetted from the auxiliary gas supply nozzle 40 acts on a peripheral area around the cut part (cut face 220). FIG. 24(b) is a model diagram showing a pressure distribution of the cutting gas 60 and auxiliary gas 70 acting on the cut material 200. As shown in FIG. 24(b), a predetermined pressure acts on the peripheral area of the cut face 220.

Figure 25:
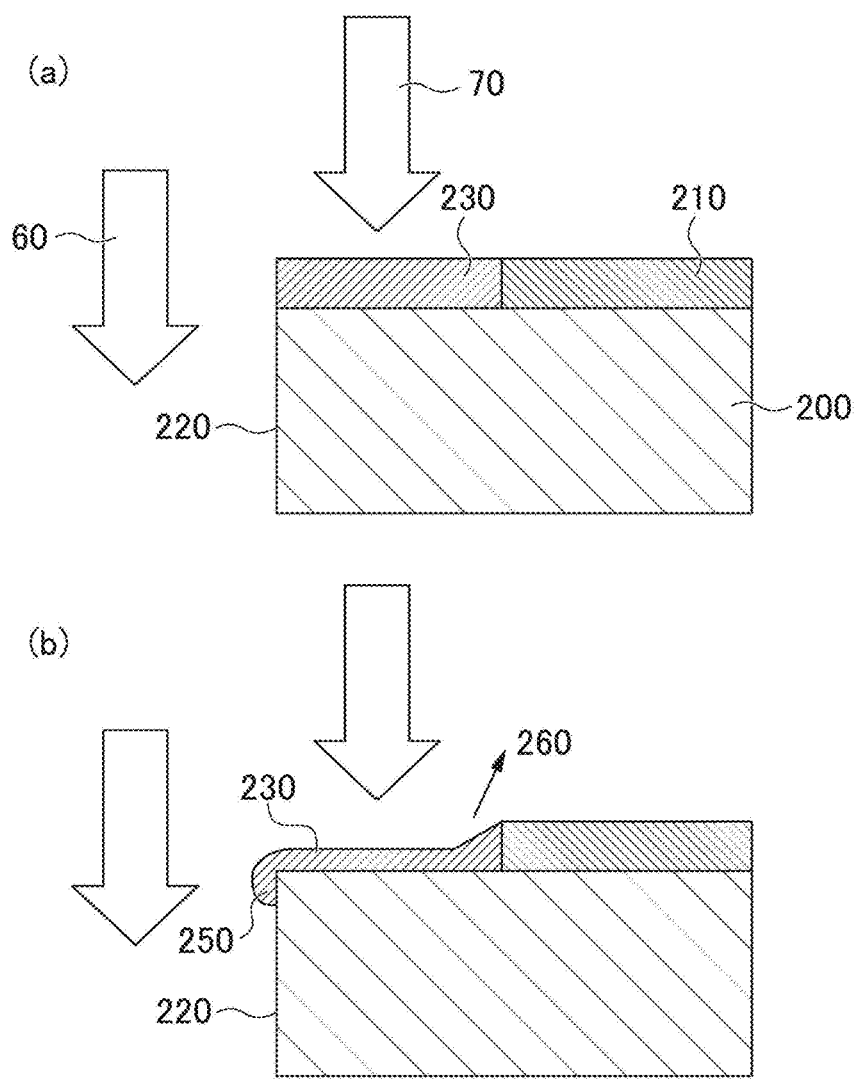
FIG. 25 shows diagrams explaining a formation of a plating metal layer according to an embodiment of the present invention, in which (a) shows a laser cutting start state of the plating metal layer and (b) shows a post-state of the plating metal layer.
Figure 26:
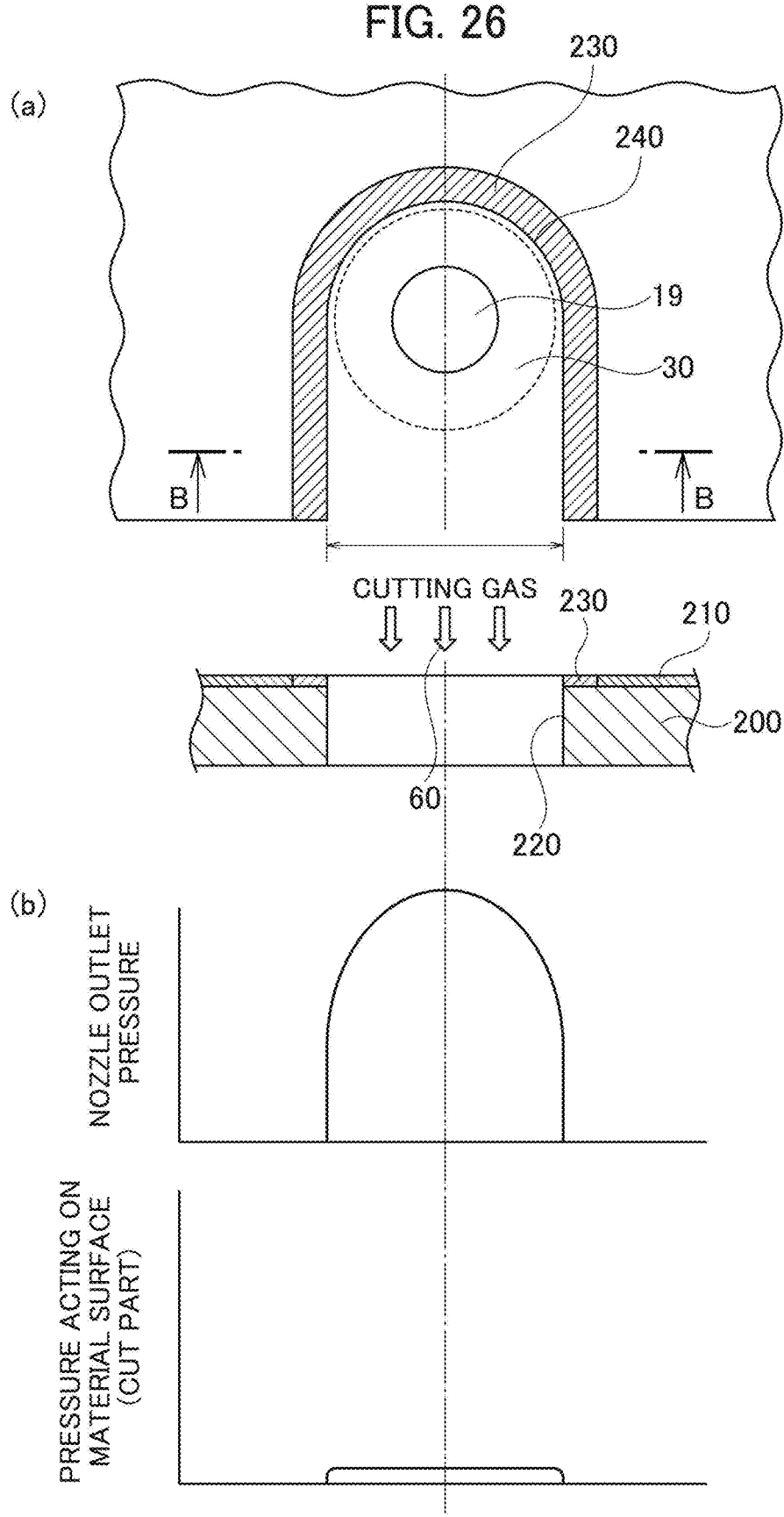
FIG. 26 shows diagrams explaining a conventional laser cutting configuration, in which (a) shows a relationship among a laser beam, a cutting gas nozzle, and a material to be cut and (b) shows pressure distributions of a cutting gas acting on the material to be cut.

FIGS. 25(a) and 25(b) are model diagrams showing the formation of a coating layer that contains the plating metal. As shown in FIG. 25(a), at the time of laser cutting, the auxiliary gas 70 is blown to the melted metal layer 230 on the surface of the steel plate 200. Then, as shown in FIG. 25(b), the melted plating metal layer 230 moves toward the cut face 220 and flows onto the cut face 220, thereby forming the coating layer 250. Using also the auxiliary gas 70 efficiently promotes an inflow of the plating metal.

FIGS. 26(a), 26(b), 27(a), and 27(b) are diagrams schematically showing cutting states of a nozzle according to a related art employing only a cutting gas. The cutting gas 60 is blown toward a cut part (cut face 220) and part of the cutting gas forms a flow that diffuses around the cut part (FIG. 26(a)). However, a pressure of the cutting gas 60 acting on a melted plating metal layer is low (FIG. 26(b)). As a result, as shown in FIGS. 27(a) and 27(b), only evaporated plating metal 260 of the melted plating metal layer 230 is expelled. It is understood that the melted plating metal layer 230 never flows to the cut face.

The kind of an irradiation laser beam is not particularly limited. It is possible to employ, for example, a $CO_2$ laser that oscillates a laser beam of 3 μm or more in wavelength. Conditions of a laser beam at the time of cutting such as a spot diameter, an output power, and a moving speed are properly set according to the thickness, processing shape, and the like of a surface-treated steel plate to be cut.

The plating metal layer of a surface-treated steel plate increases its temperature when heated with a cutting laser and melts. Parameters affecting a temperature increase of the plating metal layer are a thickness (t: units of mm) of the surface-treated steel plate, a laser output (P: units of kW), a cutting speed (v: units of m/min), and a laser cutting width (w: units of mm). Even with the same laser output, the degree of temperature increase differs depending on the plate thickness and cutting speed. Accordingly, to compare various heating conditions of a plating metal layer with one another, an index of "P/v×t×w" is used. This index is a numeric value obtained by dividing the laser output P (kW) by the cutting speed v (m/min), plate thickness t (mm), and laser cutting width w (mm). This specification calls the index a "laser heat gain index". To make plating metal flow to a cut end face and form a proper coating layer, the laser heat gain index is preferably in a range of 0.79 to 2.57. If the index is smaller than 0.79, a heat gain at the time of cutting is too small, and therefore, dross deposits on a cut part to make the cutting impossible. On the other hand, if the index exceeds 2.57, the heat gain is too large, and therefore, plating metal evaporates to reduce the quantity of plating metal flowing to a cut end face, thereby deteriorating corrosion resistance of the cut end face.

The cutting gas for laser cutting is preferably an oxygen gas, a nitrogen gas, or a mixed gas thereof to form a cut face having an oxide layer, a nitride layer, or a mixed layer. The cutting gas may be an $O_2$ gas, air, an $N_2$ gas, or a mixed gas thereof. The cutting gas may be mixed with an inert gas (for example, Ar). The flow rate and pressure of the cutting gas may properly be set according to the thickness and cutting conditions of a surface-treated steel plate.

Figure 28:
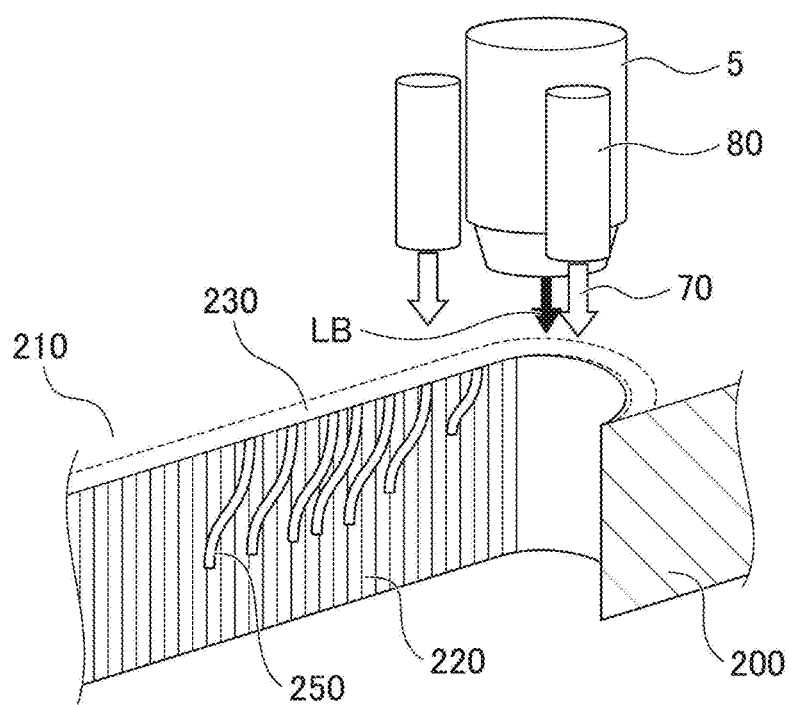
FIG. 28 shows a laser cutting example according to an embodiment of the present invention.
Figure 29:
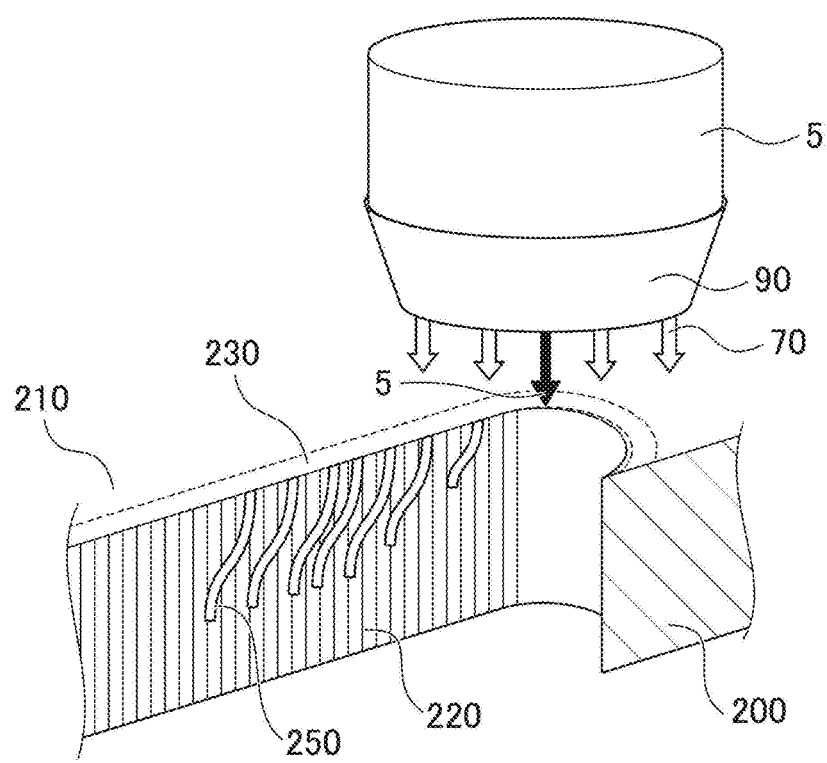
FIG. 29 shows another laser cutting example according to an embodiment of the present invention.

The auxiliary gas supply means may be any means that jets the auxiliary gas 70 after laser cutting. An example configuration is to arrange, around the machining head 5 for jetting the cutting gas, a nozzle 80 for jetting the auxiliary gas 70. As shown in FIG. 28, a plurality of auxiliary gas side nozzles 80 may be arranged beside the machining head 5. As shown in FIG. 29, the machining head 5 may have an inner nozzle (not shown) for blowing off melted metal in a cut groove and an auxiliary gas nozzle 90 serving as an outer nozzle surrounding the inner nozzle. The auxiliary gas nozzle 90 jets the auxiliary gas 70 toward the melted plating metal layer 230 to guide the same to the cut face 220.

Namely, the laser machining head adopted for the laser cutting and machining method is preferably provided with a nozzle for jetting an assist gas toward a laser machining part of a plated steel plate to blow off melted metal and form a cut face, as well as an auxiliary gas nozzle for jetting an auxiliary gas to guide plating-layer-containing metal melted at the top surface of the plated steel plate toward the cut face. This configuration guides, with the auxiliary gas, melted metal in a range of 0.27 mm to 0.5 mm from the cut face toward the cut face.

In the laser machining head, the auxiliary gas nozzle is preferably configured to jet the auxiliary gas within a range larger than the width of a laser cut-and-machined groove formed by laser cutting and machining, i.e., within a range including the melted plating metal layer 230.

The kind of the auxiliary gas is not particularly limited if it can promote a flow of melted plating metal. A composition of the auxiliary gas may be similar to that of the cutting gas or may be an oxygen gas, a nitrogen gas, or a mixed gas thereof. The composition of the auxiliary gas may differ from that of the cutting gas, or may be an inert gas (for example, Ar) only.

A flow rate of the auxiliary gas can be set according to the thickness of a surface-treated steel plate, a laser beam moving speed, and the like. As mentioned above, the auxiliary gas has a function of promoting a flow of melted plating metal toward a cut face. The flow rate of the auxiliary gas is preferably 20 L/min or greater. If the flow rate of the auxiliary gas is small, the flow of plating metal toward a cut face will be insufficient. If the flow rate is large, an inflow of melted plating metal will increase. If the flow rate is excessively large, the melted plating metal is excessively blown off, to prevent the formation of a coating layer, and therefore, it is not preferable.

Embodiment 2

Hereunder, an embodiment of the present invention will be explained. The present invention is not limited to the following embodiment.

As surface-treated steel plates, steel plates having plating layers of plating compositions shown in Tables 4 and 5 are used to prepare test pieces No. 1 to No. 47. The test piece No. 47 is a reference example according to plasma cutting employing air. The plating layers mentioned above have a plating composition of Zn—Al—Mg, Zn—Al, Zn, or Al—Si. In a column "Plating composition" in the Tables 4 and 5, a test piece mentioned as, for example, "Zn-6Al-3Mg" means a steel plate having a Zn-based plating layer containing 6% Al in weight percent and 3% Mg in weight percent. As shown in the Tables 4 and 5, the test pieces have different plating quantities (g/m²) per face, steel plate thicknesses (mm), and plating quantity to plate thickness ratios (ratios of plating quantity/plate thickness). In the Tables 4 and 5, the plating quantity per face is a value on a laser beam irradiating face.

Laser cutting is carried out by combining conditions mentioned below.

(a) Laser oscillation method: $CO_2$ laser
(b) Laser cutting width (mm): 0.24 to 0.40
(c) Laser output (kW): 2, 4, 6
(d) Cutting speed (m/min): 0.6 to 7.0
(e) Cutting gas kind: nitrogen ($N_2$), oxygen ($O_2$), nitrogen+3% oxygen ($N_2$+3% $O_2$), argon (Ar)
(f) Cutting gas pressure (MPa): 0.05 to 1.4
(g) Auxiliary gas nozzle type: side nozzle (A-type: refer to FIG. 28), ring nozzle (B-type: refer to FIG. 29)
(h) Auxiliary gas kind: nitrogen ($N_2$), oxygen ($O_2$), nitrogen+3% oxygen ($N_2$+3% $O_2$), argon (Ar)
(i) Auxiliary gas flow rate (L/min): 15 to 1900

Test pieces after cutting are photographed on their cut faces to provide image data and their coating layer average lengths (plating inflow length ratios) and plating coverages are found. The test pieces are subjected to an exposure test to be explained later, to find end face rusting ratios. In addition, the thicknesses of oxide layers and the like of the test pieces are measured according to a method to be explained later. The cut faces are subjected to a component analysis by electron beam microanalyzer (EPMA).

(Coating Layer Average Length)

FIG. 30(a) schematically shows a method of measuring a coating layer average length. A coating layer shows, as indicated with plating inflows 310, flows of plating metal coming from a steel plate surface 320 onto a cut face and extending toward a steel plate bottom face 330. As exemplary shown in FIG. 30(a), five plating inflows 310 encircled with circular marks are selected as main inflows from within an observation area, lengths (plating inflow lengths 340) thereof up to front ends thereof are measured, a ratio of each plating inflow length 340 to a steel plate thickness 350 (this specification calls the ratio the "plating inflow length ratio") is calculated, and an average of the five spots is calculated. According to the average, a coating layer average length of this embodiment is determined.

(Plating Coverage)

A method of measuring a coverage of a coating layer occupying a cut face will be explained. First, as shown in FIG. 30(b), evaluation points P1 to P5 are set. For this, the embodiment draws a vertical segment perpendicularly to the surface of the steel plate, and on the segment, P1 and P5 are set at positions 50 μm from the top and bottom of a plate end face. At a midpoint between P1 and P5, P3 is set. At a mid point between P1 and P3, P2 is set, and at a midpoint between P3 and P5, p4 is set. Among P1 to P5, points agreeing with the plating inflows 310 are counted. As exemplary shown in FIG. 30(b), the same procedure is repeated four times at optional locations to find points agreeing with the plating inflows from among the total of 20 positions (points) and a ratio thereof is calculated. For example, if there are eight agreeing points, the ratio is 8/20=0.4 (40%). This calculated value is used as the plating coverage of the embodiment.

(Thicknesses of Oxide Layer and Other Layers)

Figure 31:
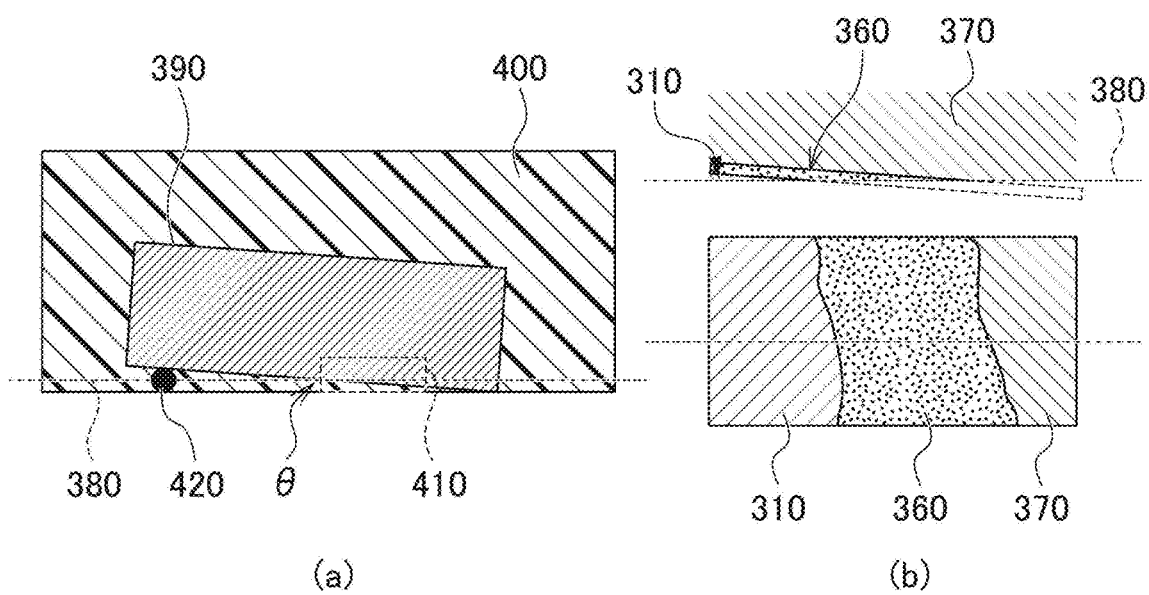
FIG. 31 explains a method of measuring the thickness of an oxidized layer or a nitrided layer, in which (a) shows a section of a measurement sample in which a test material is buried in resin and (b) shows a section and polished surface of the measurement sample after polishing.

A method of measuring the thicknesses of an oxide layer and other layers will be explained. As shown in FIG. 31 (a), a test piece 390 with a cut face thereof being faced downward is buried in resin 400 to prepare a measuring sample.

At this time, a wire 420 is arranged at an end of the test piece 390 to provide the test piece 390 with an inclination angle θ. The test piece 390 buried in resin is polished so that a plating layer, an oxide layer, and the like on the cut face of the test piece 390 are obliquely polished to expose, on a polished surface 380, a steel plate base material 370, an oxide layer 360, and plating metal 310 side by side as shown in FIG. 31 (b). Thereafter, the widths of the oxide layer 360 and others are measured. Based on the measured widths and the inclination angle θ formed at the time of burying, the thicknesses of the oxide layer and others are calculated. At optional three locations within an observation area 410 on the cut face, the same procedure is taken to measure the thicknesses of the oxide layer and others and calculate averages thereof. The averages are used as the thicknesses of the oxide layer and others according to this embodiment.

(End Face Rusting Ratio)

Figure 32:
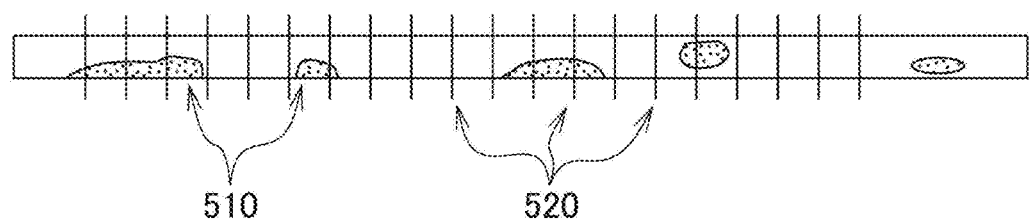
FIG. 32 explains a rusting ratio on a cut end face.

In connection with the rust resistance of members processed according to the present invention, the test pieces are subjected to an exposure test carried out in the open air for 60 days and cut faces of the test pieces are evaluated according to red rust occurrence ratios. This specification calls the red rust occurrence ratio the "end face rusting ratio". Hereunder, an end face rusting ratio measuring method will be explained. At around a central part of the cut test piece, a measuring range of 150 mm in length is set. As exemplarily shown in FIG. 32, judging positions 520 are set at 5-mm intervals in the measuring range, the number of the judging positions that cross red rust parts 510 are measured, and a crossing ratio is calculated. For example, in FIG. 32, there are twenty judging positions and seven of them cross the red rust parts. Therefore, the end face rusting ratio is calculated as 7/20=0.35 (35%).

Measured results of the plating inflow length ratio, plating coverage, oxide layer and other thicknesses, and end face rusting ratio are shown in Tables 4 and 5.

TABLE 4

| No | Plate thikness t(mm) | Plating composition | Plating quantity g/m2 | Ratio of plating quantity (g/m2)/ plate thickness(mm) | Laser oscillation method | Cutting width w (mm) | Laser output P (kW) | Cutting speed v (m/min) | Heat gain index P/v × t × w | Kind of cutting gas |
|---|---|---|---|---|---|---|---|---|---|---|
| 1 | 0.6 | Zn—6Al—3Mg | 60 | 100.0 | CO2 | 0.24 | 2 | 7.0 | 1.98 | N2 |
| 2 | 1.6 | Zn—6Al—3Mg | 90 | 56.3 | CO2 | 0.24 | 2 | 4.0 | 1.30 | N2 |
| 3 | 2.3 | Zn—6Al—3Mg | 90 | 39.1 | CO2 | 0.26 | 4 | 2.6 | 2.57 | N2 |
| 4 | 2.3 | Zn—6Al—3Mg | 190 | 82.6 | CO2 | 0.26 | 4 | 2.6 | 2.57 | N2 + 3% O2 |
| 5 | 2.3 | Zn—6Al—3Mg | 190 | 82.6 | CO2 | 0.26 | 4 | 2.6 | 2.57 | N2 + 3% O2 |
| 6 | 3.2 | Zn—6Al—3Mg | 45 | 14.1 | CO2 | 0.3 | 4 | 2.0 | 2.08 | N2 |
| 7 | 3.2 | Zn—6Al—3Mg | 90 | 28.1 | CO2 | 0.3 | 4 | 3.4 | 1.23 | O2 |
| 8 | 3.2 | Zn—6Al—3Mg | 190 | 59.4 | CO2 | 0.3 | 4 | 1.9 | 2.19 | N2 |
| 9 | 3.2 | Zn—6Al—3Mg | 300 | 93.8 | CO2 | 0.3 | 4 | 1.9 | 2.19 | N2 + 3% O2 |
| 10 | 3.2 | Zn—6Al—3Mg | 45 | 14.1 | CO2 | 0.3 | 4 | 2.0 | 2.08 | N2 |
| 11 | 3.2 | Zn—6Al—3Mg | 90 | 28.1 | CO2 | 0.3 | 4 | 2.0 | 2.08 | O2 |
| 12 | 6.0 | Zn—6Al—3Mg | 90 | 15.0 | CO2 | 0.4 | 4 | 2.0 | 0.83 | O2 |
| 13 | 6.0 | Zn—6Al—3Mg | 190 | 31.7 | CO2 | 0.36 | 4 | 2.0 | 0.93 | N2 |
| 14 | 6.0 | Zn—6Al—3Mg | 300 | 50.0 | CO2 | 0.36 | 4 | 1.5 | 1.23 | N2 + 3% O2 |
| 15 | 6.0 | Zn—6Al—3Mg | 190 | 31.7 | CO2 | 0.36 | 4 | 1.5 | 1.23 | N2 |
| 16 | 9.0 | Zn—6Al—3Mg | 120 | 13.3 | CO2 | 0.4 | 6 | 2.1 | 0.79 | O2 |
| 17 | 9.0 | Zn—6Al—3Mg | 190 | 21.1 | CO2 | 0.36 | 6 | 1.8 | 1.03 | N2 |
| 18 | 9.0 | Zn—6Al—3Mg | 190 | 21.1 | CO2 | 0.4 | 6 | 2.1 | 0.79 | O2 |
| 19 | 3.2 | Zn—11Al—3Mg | 90 | 28.1 | CO2 | 0.3 | 4 | 1.9 | 2.19 | N2 + 3% O2 |
| 20 | 3.2 | Zn—11Al—3Mg | 190 | 59.4 | CO2 | 0.3 | 4 | 1.9 | 2.19 | N2 + 3% O2 |
| 21 | 3.2 | Zn—2.5Al—3Mg | 90 | 28.1 | CO2 | 0.3 | 4 | 1.9 | 2.19 | N2 + 3% O2 |
| 22 | 3.2 | Zn—4Al—0.7Mg | 90 | 28.1 | CO2 | 0.3 | 4 | 1.9 | 2.19 | N2 + 3% O2 |
| 23 | 3.2 | Zn—4Al—0.7Mg | 190 | 59.4 | CO2 | 0.3 | 4 | 1.9 | 2.19 | N2 + 3% O2 |
| 24 | 3.2 | Zn—3.5Al—3Mg | 90 | 28.1 | CO2 | 0.3 | 4 | 1.9 | 2.19 | N2 + 3% O2 |
| 25 | 3.2 | Zn—5Al | 90 | 28.1 | CO2 | 0.3 | 4 | 1.9 | 2.19 | N2 + 3% O2 |
| 26 | 3.2 | Zn—55Al | 90 | 28.1 | CO2 | 0.3 | 4 | 1.9 | 2.19 | N2 + 3% O2 |
| 27 | 3.2 | Zn—55Al | 190 | 59.4 | CO2 | 0.3 | 4 | 1.9 | 2.19 | N2 + 3% O2 |
| 28 | 3.2 | Zn | 90 | 28.1 | CO2 | 0.3 | 4 | 1.9 | 2.19 | N2 + 3% O2 |
| 29 | 3.2 | Zn | 190 | 59.4 | CO2 | 0.3 | 4 | 1.9 | 2.19 | N2 + 3% O2 |

TABLE 4-continued

| No | Cutting gas pressure Mpa | Auxiliary nozzle type | Auxiliary gas | Auxiliary gas flow rate L/min | Plating inflow length ratio length ratio: % | Plating coverage % | Oxide/ nitride layer thick- ness μm | End face rusting ratio % | |
|---|---|---|---|---|---|---|---|---|---|
| 1 | 0.5 | A | N2 | 150 | 73 | 50 | 0.1 | 0 | Embodiment |
| 2 | 0.8 | A | N2 | 50 | 60 | 25 | 0.1 | 5 | Embodiment |
| 3 | 0.8 | B | N2 | 200 | 52 | 20 | 0.1 | 5 | Embodiment |
| 4 | 0.9 | B | N2 + 3% O2 | 200 | 54 | 25 | 0.6 | 0 | Embodiment |
| 5 | 0.9 | B | N2 + 3% O2 | 200 | 48 | 20 | 0.5 | 0 | Embodiment |
| 6 | 0.8 | A | N2 | 1000 | 32 | 10 | 0.1 | 5 | Embodiment |
| 7 | 0.05 | A | O2 | 25 | 44 | 15 | 0.7 | 0 | Embodiment |
| 8 | 0.8 | B | N2 | 800 | 55 | 20 | 0.1 | 0 | bmbodiment |
| 9 | 0.9 | B | N2 + 3% O2 | 700 | 73 | 30 | 0.6 | 0 | Embodiment |
| 10 | 0.8 | A | N2 | 1000 | 32 | 10 | 0.2 | 5 | Embodiment |
| 11 | 0.05 | A | 02 | 25 | 39 | 15 | 0.6 | 0 | Embodiment |
| 12 | 0.07 | A | 02 | 50 | 37 | 10 | 0.7 | 10 | Embodiment |
| 13 | 1.0 | A | N2 | 1500 | 43 | 30 | 0.1 | 0 | Embodiment |
| 14 | 1.0 | A | N2 + 3% O2 | 1500 | 43 | 25 | 0.7 | 0 | Embodiment |
| 15 | 1.0 | A | Ar | 1500 | 41 | 25 | 0.1 | 0 | Embodiment |
| 16 | 0.08 | B | O2 | 75 | 33 | 10 | 0.6 | 5 | Embodiment |
| 17 | 1.4 | B | N2 | 1900 | 44 | 20 | 0.1 | 0 | Embodiment |
| 18 | 0.08 | B | Ar | 75 | 26 | 10 | 0.6 | 5 | Embodiment |
| 19 | 0.9 | A | N2 + 3% O2 | 700 | 40 | 15 | 0.8 | 0 | Embodiment |
| 20 | 0.9 | A | N2 + 3% O2 | 700 | 52 | 15 | 0.7 | 0 | Embodiment |
| 21 | 0.9 | A | N2 + 3% O2 | 700 | 35 | 10 | 0.6 | 0 | Embodiment |
| 22 | 0.9 | A | N2 + 3% O2 | 700 | 32 | 10 | 0.6 | 5 | Embodiment |
| 23 | 0.9 | A | N2 + 3% O2 | 700 | 34 | 15 | 0.5 | 0 | Embodiment |
| 24 | 0.9 | A | N2 + 3% O2 | 700 | 31 | 15 | 0.8 | 0 | Embodiment |
| 25 | 0.9 | B | N2 + 3% O2 | 700 | 33 | 10 | 0.6 | 5 | Embodiment |
| 26 | 0.9 | B | N2 + 3% O2 | 700 | 28 | 10 | 0.6 | 0 | Embodiment |
| 27 | 0.9 | B | N2 + 3% O2 | 700 | 30 | 15 | 0.5 | 0 | Embodiment |
| 28 | 0.9 | B | N2 + 3% O2 | 700 | 31 | 15 | 0.6 | 0 | Embodiment |
| 29 | 0.9 | B | N2 + 3% O2 | 700 | 33 | 20 | 0.7 | 0 | Embodiment |

TABLE 5

| No | Plate thik- ness t(mm) | Plating composition | Plating quantity g/m2 | Ratio of plating quantity (g/m2) plate thick- ness(mm) | Laser oscillation method | Cutting width w (mm) | Laser output P (kW) | Cutting speed v (m/min) | Heat gain index P/v × t × w | Kind of cutting gas |
|---|---|---|---|---|---|---|---|---|---|---|
| 30 | 0.6 | Zn—6Al—3Mg | 60 | 100.0 | CO2 | 0.24 | 2 | 7.0 | 1.98 | N2 |
| 31 | 2.3 | Zn—6Al—3Mg | 90 | 39.1 | CO2 | 0.26 | 4 | 2.7 | 2.48 | N2 |
| 32 | 2.3 | Zn—6Al—3Mg | 190 | 82.6 | CO2 | 0.26 | 4 | 2.4 | 2.79 | N2 + 3% O2 |
| 33 | 3.2 | Zn—6Al—3Mg | 90 | 28.1 | CO2 | 0.38 | 4 | 4.5 | 0.73 | O2 |
| 34 | 3.2 | Zn—6Al—3Mg | 300 | 93.8 | CO2 | 0.3 | 4 | 1.9 | 2.19 | N2 + 3% O2 |
| 35 | 6.0 | Zn—6Al—3Mg | 300 | 50.0 | CO2 | 0.36 | 4 | 1.5 | 1.23 | N2 + 3% O2 |
| 36 | 3.2 | Zn—11Al—3Mg | 190 | 59.4 | CO2 | 0.3 | 4 | 1.9 | 2.19 | N2 + 3% O2 |
| 37 | 3.2 | Zn—55Al | 190 | 59.4 | CO2 | 0.3 | 4 | 1.9 | 2.19 | N2 + 3% O2 |
| 38 | 3.2 | Zn | 190 | 59.4 | CO2 | 0.3 | 4 | 1.9 | 2.19 | N2 + 3% O2 |
| 39 | 2.3 | Zn—6Al—3Mg | 190 | 82.6 | CO2 | 0.26 | 4 | 1.9 | 3.52 | N2 + 3% O2 |
| 40 | 3.2 | Zn—6Al—3Mg | 300 | 93.8 | CO2 | 0.3 | 4 | 1.6 | 2.60 | N2 + 3% O2 |
| 41 | 3.2 | Zn—6Al—3Mg | 300 | 93.8 | CO2 | 0.3 | 4 | 6.1 | 0.68 | N2 + 3% O2 |
| 42 | 6.0 | Zn—6Al—3Mg | 300 | 50.0 | CO2 | 0.36 | 4 | 0.6 | 3.09 | N2 + 3% O2 |
| 43 | 2.3 | Zn—6Al—3Mg | 190 | 82.6 | CO2 | 0.26 | 4 | 2.7 | 2.48 | N2 + 3% O2 |
| 44 | 3.2 | Zn—6Al—3Mg | 30 | 9.4 | CO2 | 0.3 | 4 | 3 | 1.39 | N2 |
| 45 | 3.2 | Zn—5Al—3Mg | 190 | 59.4 | CO2 | 0.3 | 4 | 2.0 | 2.08 | Ar |
| 46 | 2.3 | Al—10Si | 60 | 26.1 | CO2 | 0.26 | 4 | 2.7 | 2.48 | N2 + 3% O2 |
| 47 | 3.2 | Zn—6Al—3Mg | 190 | 59.4 | Plasma | | | | | |

| No | Cutting gas pressure Mpa | Auxiliary Nozzle type | Auxiliary gas | Auxiliary gas flow rate L/min | Plating inflow length ratio length ratio: % | Plating coverage % | Oxide/ nitride layer thick- ness μm | End face rusting ratio % | |
|---|---|---|---|---|---|---|---|---|---|
| 30 | 0.5 | None | | | 8 | 5 | 0.1 | 35 | Comparison |
| 31 | 0.8 | None | | | 12 | 5 | 0.1 | 30 | Comparison |

TABLE 5-continued

| | | | | | | | | | |
|---|---|---|---|---|---|---|---|---|---|
| 32 | 0.8 | None | | | 13 | 10 | 0.6 | 25 | Comparison |
| 33 | 0.05 | None | | | 11 | 0 | 0.7 | 45 | Comparison |
| 34 | 0.9 | None | | | 23 | 10 | 0.6 | 25 | Comparison |
| 35 | 1.0 | None | | | 21 | 5 | 0.7 | 35 | Comparison |
| 36 | 0.9 | None | | | 5 | 5 | 0.7 | 35 | Comparison |
| 37 | 0.9 | None | | | 10 | 5 | 0.6 | 40 | Comparison |
| 38 | 0.9 | None | | | 6 | 0 | 0.7 | 45 | Comparison |
| 39 | 0.9 | B | N2 + 3% O2 | 200 | 3 | 0 | 2.4 | 45 | Comparison |
| 40 | 0.9 | B | N2 + 3% O2 | 700 | 6 | 5 | 0.6 | 65 | Comparison |
| 41 | 0.9 | B | N2 + 3% O2 | 700 | Defective cut | | | | Comparison |
| 42 | 1.0 | B | N2 + 3% O2 | 1500 | 9 | 0 | 2.7 | 55 | Comparison |
| 43 | 0.9 | B | N2 + 3% O2 | 15 | 4 | 0 | 0.6 | 45 | Comparison |
| 44 | 0.6 | B | N2 | 1000 | 0 | 0 | 0.1 | 50 | Comparison |
| 45 | 0.8 | B | Ar | 1000 | 18 | 10 | 0 | 20 | Comparison |
| 46 | 0.9 | B | N2 + 3% O2 | 200 | 31 | 15 | 0.6 | 85 | Comparison |
| 47 | | | | | 0 | 0 | 3 | 100 | Comparison |

Figure 33:
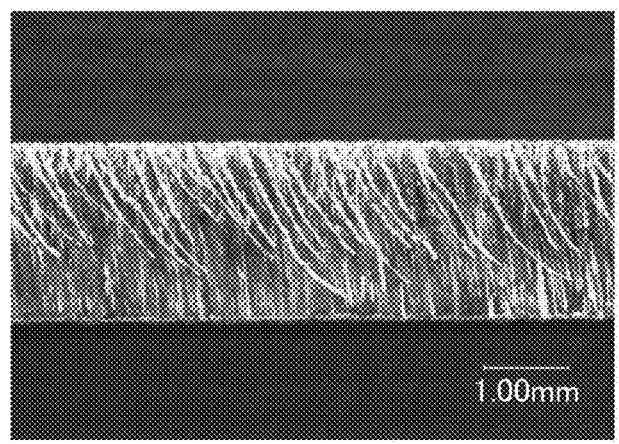
FIG. 33 shows an external appearance of a cut end face according to an embodiment of the present invention.

According to the EPMA analysis results, the test pieces No. 1 to No. 29 processed with the auxiliary gas each show a Zn component detected on a cut face. The Zn component is distributed like flows passing from the top surface of the plate irradiated with a laser beam to the bottom of the plate (FIG. 33). Based on this distribution state, it is presumed that the Zn component on the cut face is derived from the plating metal layer that has flowed from the surface of the steel plate onto the cut face.

According to the analysis results of oxygen and nitride components, the cut faces of the test pieces No. 1, No. 2, and the like employing an $N_2$ cutting gas each have a nitride layer in an area where no Zn component is present. The cut faces of the test pieces No. 4, No. 5, and the like employing a mixed gas containing $N_2$ gas and 3% $O_2$ and the cut faces of the test pieces NO. 7, No. 11, and the like employing an $O_2$ gas each have an oxide layer, a nitride layer, or a mixed layer thereof in an area where no Zn component is present.

According to these analysis results, it is presumed that an oxide layer or the like is formed on a cut face after laser cutting, and thereafter, a melted plating metal layer on the surface of a steel plate flows onto the cut face to form a coating layer over the oxide layer or the like.

As shown in the Table 4, the test pieces No. 1 to No. 29 corresponding to the embodiment of the present invention each have a plating inflow length ratio of 25% or more, a cut face coverage of 10% or more, and an oxide layer or the like under the coating layer. The test pieces No. 1 to No. 29 each show an end face rusting ratio of 10% or smaller to indicate a good end face rust resistance. Also, the test pieces No. 1 to No. 29 each have a Zn containing ratio of 40% or more in the plating metal layer and a plating quantity per face of 20 g/m² or more and each show 0.1 µm or more in the average thickness of an oxide layer or the like and 1.3×10 or more in the ratio of plating quantity (g/m²) to steel plate thickness (mm).

In addition, the laser cutting method of the test pieces No. 1 to No. 29 employs a cutting gas containing an oxygen gas, a nitrogen gas, or a mixed gas thereof, as well as an auxiliary gas. The auxiliary gas is an argon gas for the test piece No. 15 and an oxygen gas, a nitrogen gas, or a mixed gas thereof for the other. An auxiliary gas nozzle used is the side nozzle (A) or the ring nozzle (B). The laser cutting is carried out with laser heat gain indexes (P/v×t×w) within a range of 0.79 to 2.57.

On the other hand, the comparative test pieces No. 30 to No. 45 shown in the Table 5 each employ, similar to the embodiment of the present invention shown in Table 4, a surface-treated steel plate having a plating metal layer containing Zn. Their plating inflow length ratios each are lower than 25% and their end face rusting ratios each exceed 10%, to show an inferior corrosion resistance compared to the embodiment of the present invention.

Among the comparative examples, the test pieces No. 30 to No. 38 are examples each employing no auxiliary gas. The test pieces No. 39 to No. 42 are examples each employing an auxiliary gas and a laser heat gain index (P/v×t×w) out of the range of 0.79 to 2.57. The test piece No. 41 employs a laser heat gain index below 0.79, and due to a lack of heat amount, the cutting thereof is impossible. The test piece No. 43 employs an auxiliary gas flow rate below 20 L/min. The test piece No. 44 employs a ratio of plating quantity/plate thickness less than 1.3×10. The test piece No. 45 employs an argon gas as a cutting gas, to form no oxide or nitride layer.

The test piece No. 46 shown in the Table 5 is a comparative example employing plating metal (Al—Si) containing no Zn. The test piece No. 47 is a comparative example employing plasma cutting instead of laser cutting. Each of them has an end face rusting ratio far greater than 10%, to demonstrate an inferior end face corrosion resistance.

According to the above-mentioned test results, it is confirmed that a member having factors specific to the present invention demonstrates a good end face corrosion resistance.

INDUSTRIAL APPLICABILITY

The present invention is capable of carrying out laser cutting and machining without removing plating of a plated steel plate. When laser cutting a plated steel plate, the present invention is able to make melted and/or evaporated plating-layer-containing metal on the top surface of the plated steel plate flow to a cut face and coat the cut face. Accordingly, the present invention is able to efficiently laser cut and machine a plated steel plate, and after the laser cutting and machining, requires no rustproofing process to be carried out again on the cut face.

What is claimed is:

1. A laser cut-and-machined product made from a plated steel plate, the laser cut-and machined product comprising:
   a plating metal layer formed on a top surface of the plated steel plate;
   a cut face formed on the plated steel plate; and
   a coating layer that is formed on the cut face from a material of the plating metal layer in a region around the cut face that is melted and/or evaporated at the time of laser cutting and machining.

2. The laser cut-and-machined product according to claim 1, wherein a plating thickness of the plating metal layer around an upper edge of the cut face is thinner than a plating thickness of the plating metal layer at a position away from the cut face.

3. The laser cut-and-machined product according to claim 1, wherein a plating melting range is within a range of 0.27 mm to 0.5 mm from the cut face.

4. A surface-treated steel plate, comprising:
- a plating metal layer formed on a top surface of the surface-treated steel plate;

wherein a cut face formed on the surface- treated steel plate; and
- a coating layer that is formed on the cut face from a material of the plating metal layer in a region around the cut face.

5. The surface-treated steel plate according to claim 4, wherein an area of the coating layer that covers the cut face is 10% or more of an area of the cut face, or the coating layer covers the cut face by an extent of 30% or more of a plate thickness from a top or bottom surface of the surface-treated steel plate.

* * * * *

UNITED STATES PATENT AND TRADEMARK OFFICE
CERTIFICATE OF CORRECTION

| | |
|---|---|
| PATENT NO. | : 11,559,857 B2 |
| APPLICATION NO. | : 16/933600 |
| DATED | : January 24, 2023 |
| INVENTOR(S) | : Hideo Hara et al. |

It is certified that error appears in the above-identified patent and that said Letters Patent is hereby corrected as shown below:

On the Title Page

Item (73)/Assignees (Line 1), please change:
"AMADA CO., LTD., Kanagawa ( JP )"
To:
--AMADA CO., LTD., Kanagawa ( JP ); NISSHIN STEEL CO., LTD., Tokyo ( JP )--

Signed and Sealed this
Fourteenth Day of March, 2023

Katherine Kelly Vidal
*Director of the United States Patent and Trademark Office*